(12) United States Patent
Komori et al.

(10) Patent No.: US 7,678,983 B2
(45) Date of Patent: Mar. 16, 2010

(54) MUSIC EDIT DEVICE, MUSIC EDIT INFORMATION CREATING METHOD, AND RECORDING MEDIUM WHERE MUSIC EDIT INFORMATION IS RECORDED

(75) Inventors: Akihiro Komori, Tokyo (JP); Kosei Yamashita, Kanagawa (JP); Yasushi Miyajima, Kanagawa (JP); Motoyuki Takai, Tokyo (JP); Norikazu Hiraki, Kanagawa (JP); Yuichi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 12/093,059

(22) PCT Filed: Dec. 7, 2006

(86) PCT No.: PCT/JP2006/324884

§ 371 (c)(1),
(2), (4) Date: May 8, 2008

(87) PCT Pub. No.: WO2007/066813

PCT Pub. Date: Jun. 14, 2007

(65) Prior Publication Data

US 2009/0044689 A1 Feb. 19, 2009

(30) Foreign Application Priority Data

Dec. 9, 2005 (JP) ............................. 2005-356820

(51) Int. Cl.
*G06F 7/00* (2006.01)
(52) U.S. Cl. ..................... 84/600; 84/601; 84/625; 707/104.1; 700/94; 381/119
(58) Field of Classification Search ........... 84/600–602, 84/625, 660; 381/119; 700/94; 707/104.1
See application file for complete search history.

(56) References Cited

U.S. PATENT DOCUMENTS

2004/0205648 A1 * 10/2004 Tinsley et al. ............... 715/530

(Continued)

FOREIGN PATENT DOCUMENTS

| JP | 2000 56780 | 2/2000 |
|---|---|---|
| JP | 2001 109470 | 4/2001 |
| JP | 2003 44046 | 2/2003 |
| JP | 2003 108132 | 4/2003 |
| JP | 2004 198759 | 7/2004 |
| JP | 2004 219947 | 8/2004 |

OTHER PUBLICATIONS

U.S. Appl. No. 12/095,745, filed Jun. 2, 2008, Yamashita, et al.
U.S. Appl. No. 12/092,641, filed May 5, 2008, Miyajima, et al.

*Primary Examiner*—David S. Warren
(74) *Attorney, Agent, or Firm*—Oblon, Spivak, McClelland, Maier & Neustadt, L.L.P.

(57) ABSTRACT

A music editing apparatus that can accomplish editing of superimposing or connecting whole or part of each of many songs such that their beats adjusted is provided. The music editing apparatus includes a remix processing section which performs a remix process based on both meta data that are pre-generated corresponding to song data and that contain at least a time-based beat position and a file for deciding a remix pattern; a synchronizing reproduction controlling section which generates a master beat, sends the master beat to the remix processing section, and reproduces a plurality of songs based on individual entries of the meta data according to the remix process that the remix processing section has designated corresponding to the remix pattern and the meta data; and a mixing section which mixes songs reproduced by the synchronizing reproduction controlling section. The remix processing section performs the remix process based on a remix pattern file structured as hierarchical layers each of which has a control parameter portion and a data entity portion.

8 Claims, 29 Drawing Sheets

U.S. PATENT DOCUMENTS

| | | | |
|---|---|---|---|
| 2007/0083380 A1* | 4/2007 | Martinez | 705/1 |
| 2007/0083497 A1* | 4/2007 | Martinez | 707/3 |
| 2007/0083537 A1* | 4/2007 | Martinez | 707/101 |
| 2007/0083762 A1* | 4/2007 | Martinez | 713/176 |
| 2007/0208564 A1* | 9/2007 | Tran | 704/254 |
| 2007/0255739 A1* | 11/2007 | Miyajima et al. | 707/101 |
| 2007/0261537 A1* | 11/2007 | Eronen et al. | 84/611 |
| 2008/0269931 A1* | 10/2008 | Martinez | 700/94 |
| 2009/0019995 A1* | 1/2009 | Miyajima | 84/625 |
| 2009/0044689 A1* | 2/2009 | Komori et al. | 84/625 |
| 2009/0116668 A1* | 5/2009 | Davidson | 381/119 |
| 2009/0133568 A1* | 5/2009 | Miyajima et al. | 84/625 |
| 2009/0157203 A1* | 6/2009 | Bregar et al. | 700/94 |

* cited by examiner

| BAR/BEAT (31) | ATTRIBUTE (32) | SAMPLE POSITION (33) |
|---|---|---|
| 11 | 01800001 | 23190 |
| 12 | 01000001 | 65280 |
| 13 | 01000001 | 83200 |
| 14 | 01000001 | 100416 |
| 21 | 01800001 | 118400 |
| 22 | 01000001 | 136192 |

| SONG ID (FILE) | REPRODUCTION PORTION | EFFECT UPON REPRODUCTION | CONNECTION PATTERN | EFFECT UPON CONNECTION | SE UPON CONNECTION |
|---|---|---|---|---|---|
| ID_A | CATCHY PART | NONE | CROSS-FADE | REVERB | NONE |
| ID_B | INTRODUCTION | LOW-CUT | CUT-IN | LOW-CUT | NONE |
| ID_C | BAR 8-20 | NONE | CROSS-FADE | DISTORTION | SE_A |
| ID_D | ALL | HIGH-CUT | SIMULTANEOUS REPRODUCTION: CATCHY PART | NONE | NONE |
| ID_E | CATCHY PART | LOW-CUT | NONE | NONE | NONE |

```
<?xml version="1.0"?>
-<song_list id="SONG_LIST_1">
    <controller transition="ID_A:ID_B"pattern="CROSS_FADE"effect="REVERB"
        se=""/>
    <controller transition="ID_B:ID_C"pattern="CUT_IN"effect="LOW_CUT"
        se=""/>
    -<song id="ID_A">
        <controller play_sebment="MELODY_BLOCK:A"effect=""/>
        -<melody_block>
            <melody type="INTRO"/>
            <melody type="A"/>
            <melody type="B"/>
            <melody type="SABI"/>
            <melody type="ENDING"/>
        </melody block>
    </song>
    -<song id="ID_B">
        <controller play_segment="MELODY_BLOCK:INTRO"effect-"LOW_CUT"/>
        -<melody_block>
            <melody type="INTRO"/>
            <melody type="A"/>
            <melody type="SABI"/>
        </melody_block>
    </song>
-<song id="ID_C">
    <controller play¥segment="BAR:8-20"effect""/>
</song>
</song_list>
```

Fig. 20
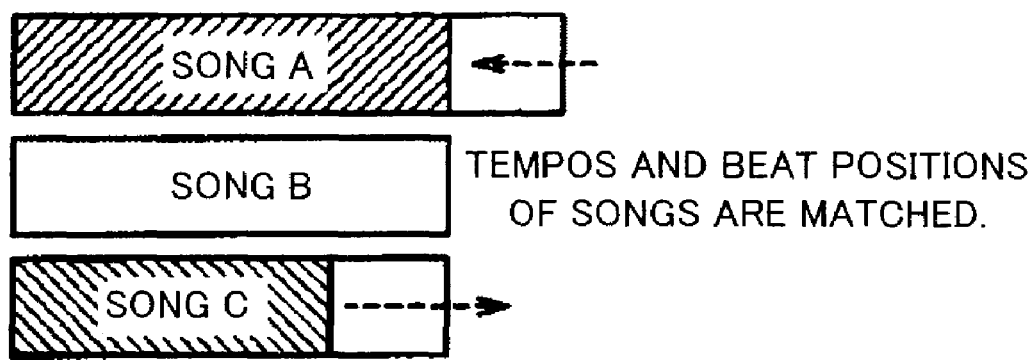
TEMPOS AND BEAT POSITIONS OF SONGS ARE MATCHED.

Fig. 22

MUSIC EDIT DEVICE, MUSIC EDIT INFORMATION CREATING METHOD, AND RECORDING MEDIUM WHERE MUSIC EDIT INFORMATION IS RECORDED

TECHNICAL FIELD

The present invention relates to a method of creating music edit information that designates a connecting method of, for example, song parts or bars of a song to be edited, in particular, to a music editing apparatus that edits music content or the like as materials corresponding to edit information created on the basis of the creating method and newly creates a song (music content). In addition, the present invention relates to a record medium on which edit information described on the basis of the method of creating the music edit information is recorded.

BACKGROUND ART

As memory type audios have become common, users daily carry a large number of songs with them. With memory type audios that allow their users to listen to a large number of songs continuously without need to change mediums, a style in which the users not only sequentially listen to songs of each CD album, but listen to songs shuffled in all CD albums and their favorite songs arranged as play lists has become common. It can be said that the degree of freedom of which the users listen to their favorite songs in their favorite orders has increased.

However, it is assumed that the users listen to each song from the beginning to the end. In addition, there is a non-sound region between songs. In other words, one song is the minimum unit. Thus, the user has to listen to music on the basis of one song. The user's concentration, namely his or her enthusiasm, breaks at such a non-sound region between songs. As a result, the users are difficult to continuously listen to songs with his or her tension kept.

FIG. 28 shows conventional music reproduction using song A and song B. In this case, the two songs are reproduced with their original tempos. Of course, there is a non-sound region between these songs.

Thus, a technique of combining a plurality of music materials and editing them was developed. Japanese Patent Application Laid-Open No. 2003-44046 discloses a technique of combining a plurality of music materials that are input through a user's keyboard and mouse and allowing him or her to interactively edit them and to enjoy the reproduced songs. In the technology, sound pieces such as sound patterns and one-shots and tips composed of effects applicable to sound pieces are assigned to individual keys of the keyboard. When the user presses the keys, tips corresponding thereto are executed. When a plurality of keys are pressed at the same time, corresponding tips are combined and output. In addition, by successively pressing keys, corresponding tips are chronologically combined and thereby a song is composed.

However, with the foregoing technique disclosed as Japanese Patent Application Laid-Open No. 2003-44046, it is difficult to recompose a song by connecting parts of a plurality of songs in such a manner that their beats are kept equal like with a remix created, for example, by a disc jockey (DJ). A DJ is currently a common occupation. There are label companies that dedicatedly deal with remix music. The number of users who enjoy remix music is increasing.

The present invention was created from the foregoing point of view. An object of the present invention is to provide a method of creating music edit information used in editing many songs recorded in a record medium such as a hard disk or a flash memory in such a manner that all or parts of them are overlaid or connected with their beats kept constant. Another object of the present invention is to provide a music editing apparatus that uses music content as materials and creates a new song (music content) corresponding to edit information based on the foregoing creating method. A further object of the present invention is to provide a record medium on which edit information described according to the creating method for the music edit information is recorded.

DISCLOSURE OF THE INVENTION

To solve the foregoing program, the music editing apparatus of the present invention has a remix processing section which performs a remix process based on both meta data that are pre-generated corresponding to song data and that contain at least a time-based beat position and a file for deciding a remix pattern; a synchronizing reproduction controlling section which generates a master beat, sends the master beat to the remix processing section, and reproduces a plurality of songs based on individual entries of the meta data according to the remix process that the remix processing section has designated corresponding to the remix pattern and the meta data; and a mixing section which mixes songs reproduced by the synchronizing reproduction controlling section, the remix processing section being characterized in that the remix processing section performs the remix process based on a remix pattern file structured as hierarchical layers each of which has a control parameter portion and a data entity portion.

To solve the foregoing program, the method of creating edit information is a method of creating edit information referred to as a remix pattern by a music editing apparatus having a remix processing section which performs a remix process based on both meta data that are pre-generated corresponding to song data and that contain at least a time-based beat position and a file for deciding a remix pattern; a synchronizing reproduction controlling section which generates a master beat, sends the master beat to the remix processing section, and reproduces a plurality of songs based on individual entries of the meta data according to the remix process that the remix processing section has designated corresponding to the remix pattern and the meta data; and a mixing section which mixes songs reproduced by the synchronizing reproduction controlling section, characterized in that a remix pattern file structured as hierarchical layers each of which has a control parameter portion and a data entity portion is created by causing the control parameter portion of a lower hierarchical layer which composes a data portion of an upper hierarchical layer to process the data entity portion of the same hierarchical layer.

To solve the foregoing problem, the record medium on which edit information has been recorded of the present invention is a record medium on which edit information referred to as a remix pattern by a music editing apparatus has been recorded, the music editing apparatus having a remix processing section which performs a remix process based on both meta data that are pre-generated corresponding to song data and that contain at least a time-based beat position and a file for deciding a remix pattern; a synchronizing reproduction controlling section which generates a master beat, sends the master beat to the remix processing section, and reproduces a plurality of songs based on individual entries of the meta data according to the remix process that the remix processing section has designated corresponding to the remix pattern and the meta data; and a mixing section which mixes songs reproduced by the synchronizing reproduction controlling section, characterized in that recorded in a remix pattern file structured as hierarchical layers each of which has a control parameter portion and a data entity portion is edit information created by causing the control parameter portion of a lower hierarchical layer which composes a data portion of an upper hierarchical layer to process the data entity portion of the same hierarchical layer.

According to the present invention, an editing process of overlaying or connecting all or parts of many songs recorded in a record medium such as a hard disk or a flash memory and reproducing the overlaid or connected song with their beats kept constant can be accomplished. In addition, all or parts of songs can be connected and reproduced situation by situation in real time.

BRIEF DESCRIPTION OF DRAWINGS

FIG. 5 is a schematic diagram showing time-based meta data;

FIG. 9 is a schematic diagram showing a specific example of a remix pattern file;

FIG. 11 is a schematic diagram showing an example of a remix pattern file described according to XML;

FIG. 17 is a schematic diagram for describing a connection using cut-in;

FIG. 20 is a schematic diagram for describing simultaneously synchronous reproduction;

FIG. 22 is a schematic diagram for describing partial reproduction;

BEST MODES FOR CARRYING OUT THE INVENTION

Figure 1:
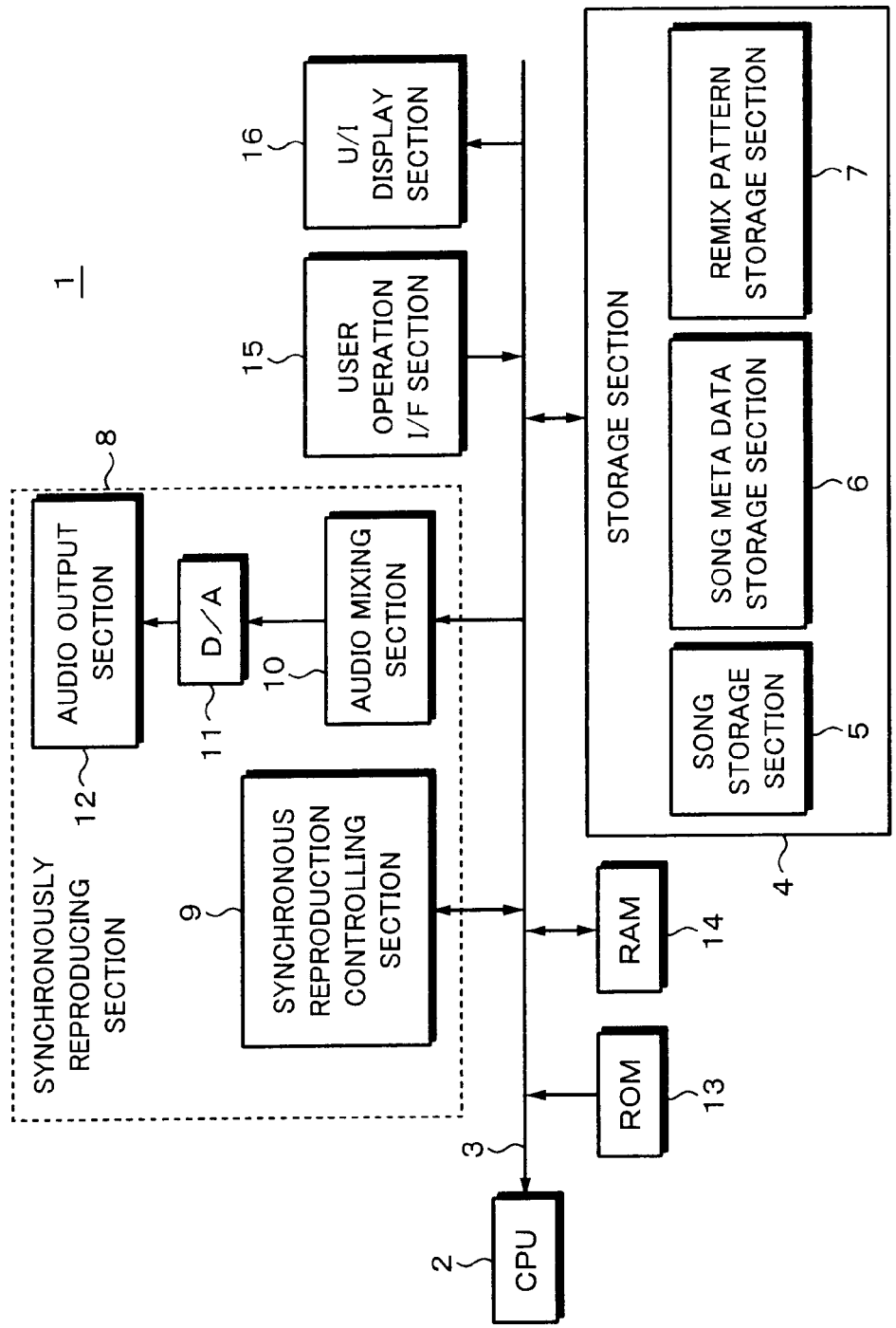
FIG. 1 is a block diagram showing a music editing apparatus 1 according to an embodiment of an apparatus and a method of the present invention.

Next, with reference to the accompanying drawings, best mode embodiments for carrying out the present invention will be described. FIG. 1 is a block diagram showing a music editing apparatus 1 according to an embodiment of an apparatus and a method of the present invention.

The music editing apparatus 1 can overlay song A and song B having different tempos of music content data (original data) of songs provided through various types of record mediums such as a hard disk (HD), a compact disc (CD), a mini disc (MD), and a digital versatile disc (DVD) and through networks such as the Internet with the following meta data described later and reproduce them with their beats kept constant. In other words, the music editing apparatus 1 is an apparatus that automatically reproduces songs in a DJ style.

As shown in FIG. 1, in the music editing apparatus 1, a central processing unit (CPU) 2 is connected to a storage section 4 and a synchronously reproducing section 8 through a bus 3. In addition, connected to the CPU 2 through the bus 3 are a ROM 13, a RAM 14, a user operation I/F section 15, and a user interface (U/I) display section 16.

The CPU 2 decides a connecting method for songs in real time and supplies necessary song materials to the synchronously reproducing section 8 at a necessary timing. In addition, according to a user's operation, the CPU 2 designates a tempo and beat synchronization/asynchronization for the synchronously reproducing section 8.

The storage section 4 is composed of a song storage section 5, a song meta data storage section 6, and a remix pattern storage section 7. The song storage section 5 stores data of a plurality of songs. A storage section such as a flash memory or a hard disk that a console type music reproducing apparatus or a portable music reproducing apparatus has may be connected as an external device to the song storage section 5. Song data that are stored in the song storage section 5 may be either compressed music data or non-compressed data.

The song meta data storage section 6 has stored time-based meta data added to songs. As will be described later, meta data are time-based auxiliary data added to songs and describe position information of a beat as well as a tempo, head position information of a bar (simply referred to as the head), and melody information such as an introduction and a theme (a catchy part).

Like the song storage section 5, the remix pattern storage section 7 is not restricted as long as it is a storage device. The remix pattern storage section 7 is a storage section that designates a remix pattern and that stores a remix pattern file. As will be described later, a remix pattern file is not only a file that describes the order of songs, but a file that describes what parts of song A and song B are used and combined at what parts thereof.

The synchronously reproducing section 8 is a signal processing block with which the music editing apparatus 1 automatically reproduces songs in the DJ style. The synchronously reproducing section 8 reproduces song materials designated by the remix control function of the CPU 2 in synchronization with a reference beat. The synchronously reproducing section 8 is composed of a synchronous reproduction controlling section 9, an audio mixing section 10, a digital/analog converting section (D/A) 11, and an audio output section 12.

The synchronous reproduction controlling section 9 has a plurality of audio signal generating sections and reproduces a plurality of audio signals in synchronization with a locally generated clock signal. In addition, the synchronous reproduction controlling section 9 always monitors the position of a song that is being reproduced on the basis of meta data supplied from the meta data storage section 6 and sends the current reproduction position (such as the sample number of the song that is being reproduced) and reproduction position that represents what beat of what bar is being reproduced back to the remix process function section of the CPU 2.

The audio mixing section 10 combines a plurality of audio signals generated by the plurality of audio signal generating sections of the synchronous reproduction controlling section 9 and outputs the combined signal. The D/A 11 converts the digital signal reproduced by the audio mixing section 10 into an analog signal. The audio output section 12 amplifies the analog audio signal supplied from the D/A 11 and outputs the amplified signal to a speaker, a headphone, or the like.

The ROM 13 stores a music editing program composed of processes based on the music editing method according to the present invention. In addition, the ROM 13 stores various types of default data. The RAM 14 becomes a work area with which the CPU 2 executes the music editing program. In addition, the RAM 14 stores various types of update data with which the CPU 2 executes the music editing program.

The user operation I/F section 15 is, for example, a keyboard, a mouse, a touch panel, and/or the like that accepts user's operations. The U/I display section 16 is a display section including a touch panel that displays a current operation state and a music editing process state and accepts user's operations. The U/I display section 16 is, for example, a liquid crystal display device. Of coarse, the U/I display section 16 may be a CRT.

Figure 2:
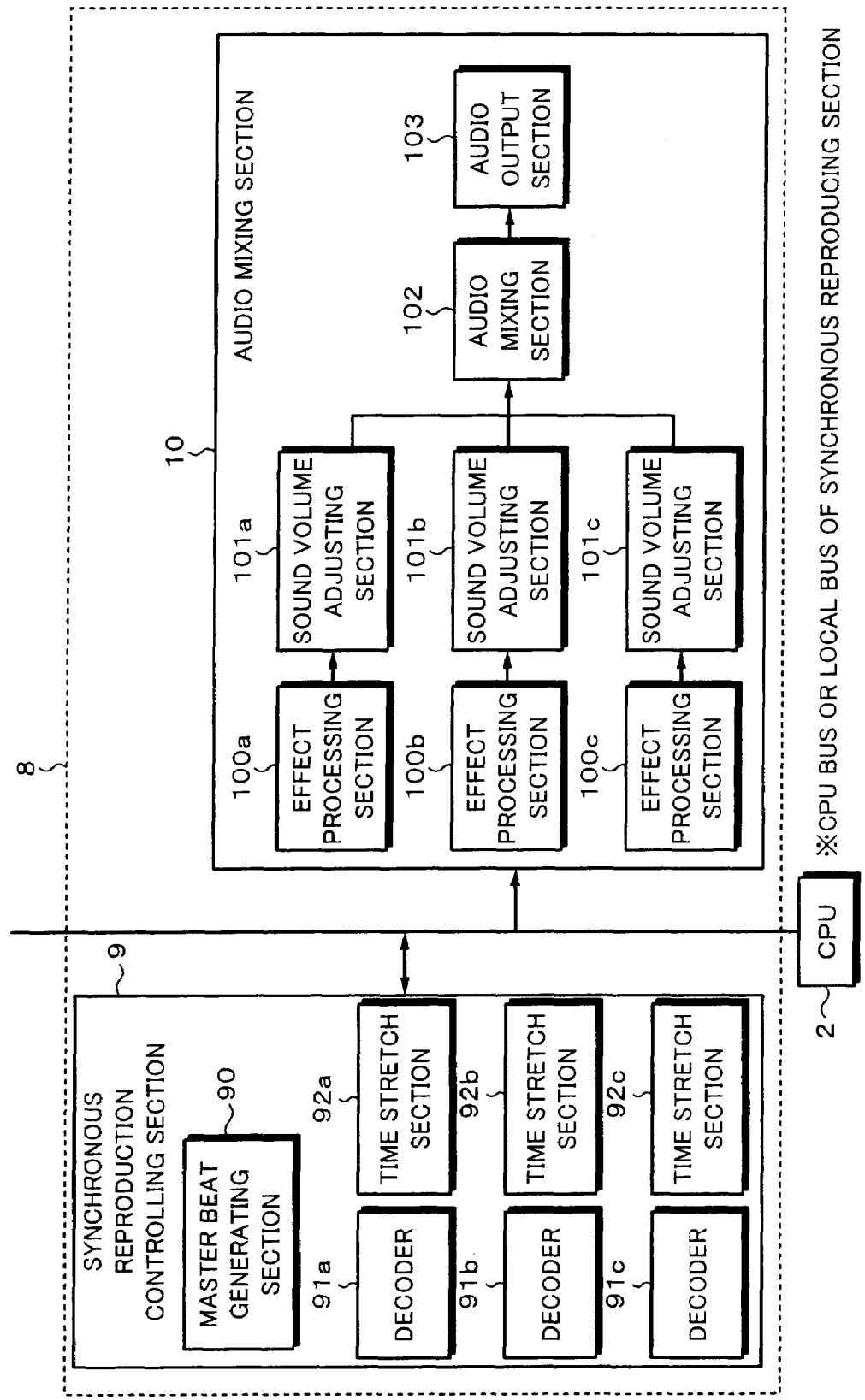
FIG. 2 is a block diagram showing detailed structures of a synchronous reproduction controlling section and an audio mixing section.

FIG. 2 is a block diagram showing detailed structures of the synchronous reproduction controlling section 9 and the audio mixing section 10. The synchronous reproduction controlling section 9 is composed of a master beat generating section 90 and three audio signal generating sections. The master beat generating section 90 generates a clock equivalent to a beat. Specifically, the master beat generating section 90 outputs a tempo of a remix and a beat signal in synchronization with the tempo. The master beat generating section 90 generates a head signal of a bar and a regular beat signal other than the head signal corresponding to a designated beat (in four-four time, three-four time, and so forth) and outputs them.

The three (tracks of) audio signal generating sections have three tracks to output a plurality of stereo sounds in real time, as a typical example, song A, song B, and sound effect (SE). Of course, the audio signal generating section may have four tracks, five tracks, or more according to the number of songs.

The audio signal generating section synchronously reproduces bar/beat positions of songs corresponding to the bar/beat position of the master beat based on the synchronous signal (clock or beat) generated by the master beat generating section 90.

For individual tracks, decoders 91a, 91b, and 91c and time stretch sections 92a, 92b, and 92c are provided. The decoders 91a, 91b, and 91c decode compressed sounds that have been compressed according to MP3 or ATRAC and output PCM data. In this case, since an SE is short and its data size is small, it does not always need to have been compressed. Thus, the decoder for the SE track can be omitted. The time stretch sections 92a, 92b, and 92c convert a reproduction speed while the pitch is kept constant. The time stretch sections 92a, 92b, and 92c cause tempos of song materials to match the tempo of the reference beat based on meta data supplied from the song meta data storage section 6. The time stretch sections 92a, 92b, and 92c perform a process of changing the reproduction speed in real time based on the ratio of the original tempos of songs and the master beat. Thus, the original tempos of songs can be matched with the tempo of the master beat. Of course, as described above, the pitch is not changed.

The audio signal generating sections may have a pitch shifter function. The pitch shifter function changes the pitch while the reproduction speed is kept constant. The pitch shifter function is used to musically harmonize song materials having different keys and pitches. However, the pitch shifter function is not an essential function, but an additional function.

The audio mixing section 10 has three effect processing sections 100a, 100b, and 100c and three sound volume adjusting sections 101a, 101b, and 101c corresponding to the three tracks of audio signal generating sections. The outputs of these three systems are mixed by an audio mixing section 102, amplified by an audio output section 103, and then output to the external speaker, headphone, or the like. The audio mixing section 10 can perform an effect process and an sound volume adjustment process for the individual tracks of the output audio signals supplied from the audio signal generating sections.

Figure 3:
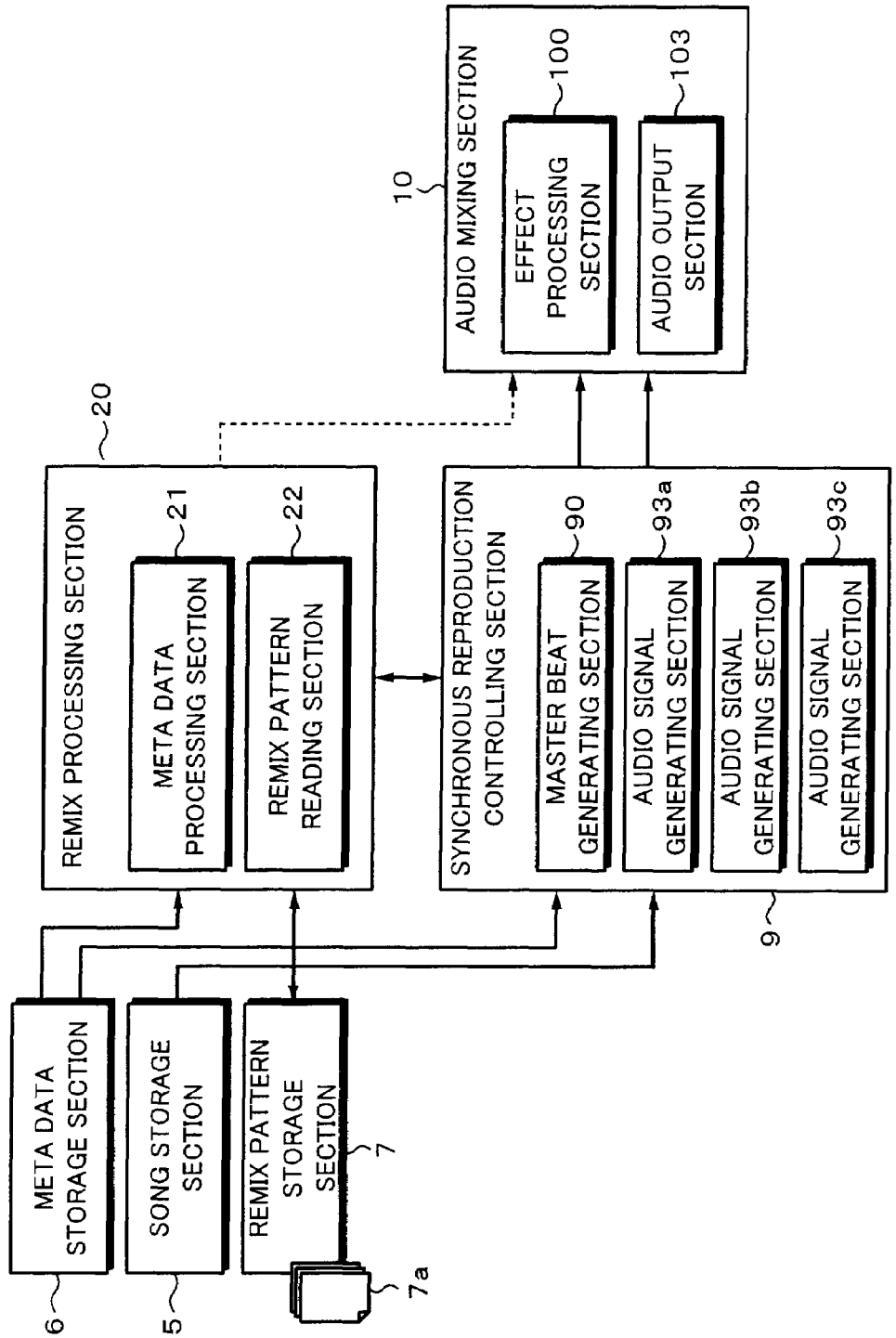
FIG. 3 is a functional block diagram showing the music editing apparatus.

FIG. 3 is a functional block diagram of the music editing apparatus 1. The functions of the CPU 2 as a hardware structure in FIG. 1 are represented by a remix processing section 20. The remix processing section 20 is divided into a meta data processing section 21 and a remix pattern reading section 22.

The remix processing section 20 causes the meta data processing section 21 to process meta data stored in the song meta data storage section 6. As described above, time-based meta data have been added to songs. Meta data contain not only a tempo, but position information of a beat, head position information of bars, and melody information of an introduction, a catchy part, and so forth.

The meta data processing section 21 reads time-based meta data corresponding to the song and checks the position information of the song according to the designated remix pattern information read by the remix pattern reading section 22. For example, knowing the current beat and the positions of beats of songs to be combined, the meta data processing section 21 decides how to reproduce songs and a sound effect at what timings.

In addition, the remix processing section 20 causes the remix pattern reading section 22 to read a remix pattern file 7a stored in the remix pattern storage section 7. The remix pattern file 7a is a file that designates whether or not fade-out is performed, whether or not cut-in is performed, and what SE is performed. A remix pattern may be a data sequence designated by the user or a third party (instructing how to connect this song) or created according to an automatically creating algorithm (namely, a remix decided by the machine side).

The synchronous reproduction controlling section 9 causes the master beat generating section 90 to generate a master beat, sends the master beat to the remix processing section 20, and reproduces a plurality of songs based on individual entries of meta data supplied from the meta data storage section 6 according to the remix process designated by the remix processing section 20 on the basis of a remix pattern and meta data.

Figure 4:
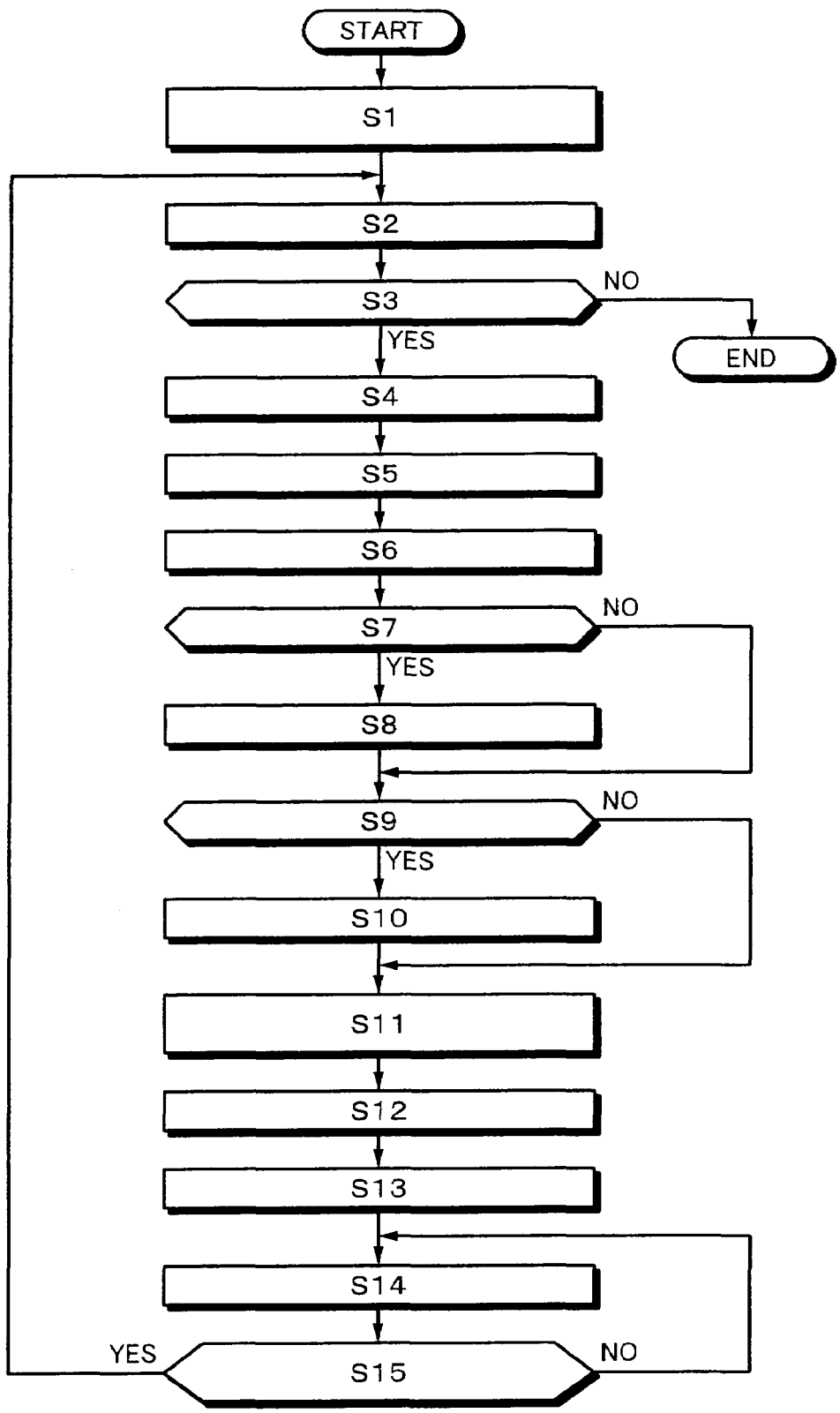
FIG. 4 is a flow chart showing processes of a music editing program that the music editing apparatus executes through a CPU.

FIG. 4 shows processes of a music editing program that the music editing apparatus 1 executes with the CPU 2. This music editing program is an embodiment of the music editing method according to the present invention.

First, the remix processing section 20 of the CPU 2 causes the remix pattern reading section 22 to read the remix pattern file 7a from the remix pattern storage section 7 and obtains the remix pattern file 7a (at step S1). Thereafter, the CPU 2 causes the synchronous reproduction controlling section 9 to obtain a song, for example, a first song (at step S2). When there is another song (YES at step S3), the CPU 2 causes the master beat generating section 90 of the synchronous reproduction controlling section 9 to decide a tempo (at step S4). The tempo may be fixed to 140 or the user may designate the tempo. Thereafter, the CPU 2 obtains a connection pattern (described in the pattern file) (at step S5).

Since the pattern that connects songs has been decided, the CPU 2 obtains meta data of the songs (at step S6). For example, meta data of song B are obtained. Thereafter, the CPU 2 determines whether or not the effect process is necessary on the basis of the remix pattern file (at step S7). When necessary (YES), the CPU 2 causes the effect processing section 100 to perform a predetermined effect (at step S8).

Thereafter, the CPU 2 determines whether or not the sound volume fading process is necessary on the basis of the remix pattern file (at step S9). For example, when song A and song B are edited to be overlaid, the CPU 2 selects whether or not sound volume fade of increasing or decreasing sound volumes of the songs is necessary. When necessary (YES), the CPU 2 sets a fade parameter (at step S10). Although it has been assumed that sound volumes are automatically increased or decreased, the CPU 2 sets the fade parameter.

The CPU 2 sets the original tempos of the songs to the master beat generating section 90 of the synchronous reproduction controlling section 9 (at step S11). The original tempos of the songs have been added to meta data of the songs. Thereafter, the CPU 2 obtains a free audio signal generating section of the foregoing three channels of the synchronous reproduction controlling section 9. In the foregoing specific example, the CPU 2 obtains a free audio signal generating section from three channels and sets a song to be reproduced to the obtained audio signal generating section (at step S13).

After having obtaining the current reproduction position of each song (at step S14), the CPU 2 determines whether or not a point at which the next song is prepared has occurred (at step S15). When the SE is, for example, cross-fade, it ends several bars before the relevant bar. When the SE is, for example, cut-in, since it immediately starts, the CPU 2 can prepare the SE one bar before it. Of course, simultaneous reproduction is a reproduction of which songs are simultaneously reproduced. The CPU 2 determines whether or not such a point has occurred. When a point at which a song is prepared has not occurred, the flow of the processes returns to step S14. At step S14, the CPU 2 waits until such a point has occurred. When a point at which the next song is prepared has occurred (YES), the flow of the processes returns to step S2.

FIG. 5 is a schematic diagram showing time-based meta data 30. As described above, the meta data 30 are time-based auxiliary data added to a song. The meta data 30 describes not only tempo, but position information of a beat, head position information of bars, and melody information of an introduction and a catchy part. A bar/beat 31 represents a beat number of one bar. "11" represents the first beat of the first bar. "14" represents the fourth beat of the first bar. Likewise, "21" represents the first beat of the second bar. In particular, "11" and "21" represent the first beat of each bar. An attribute 32 represents an entity at the position, namely the position of the head of a bar, a normal beat, a melody, or a theme (a catchy part). "01800001" represents the head of a bar as an attribute of "11" and "21". When a song has been sampled at 44.1 kHz, the number of samples per second is 44100. The position is described in the unit of a sample. The meta data 30 shown in FIG. 5 are described in the text format or binary format.

Figure 6:
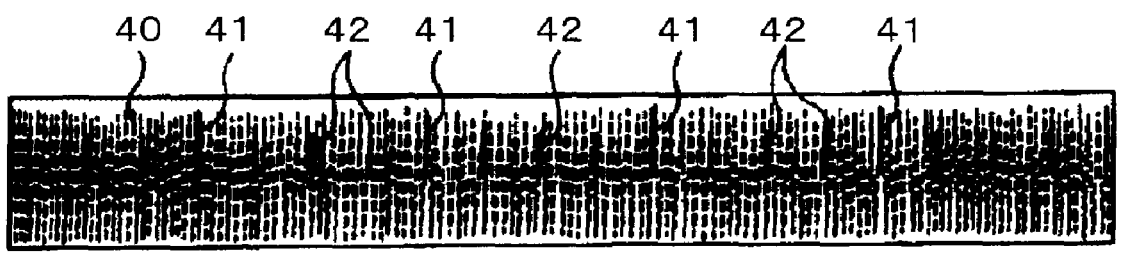
FIG. 6 is a schematic diagram showing a specific example of time-based meta data.

FIG. 6 shows a specific example of time-based meta data. FIG. 6 shows time-based meta data of an audio signal 40 and beats 41 and 42. The audio signal 40 varies left to right as time elapses and the beats ride on the audio signal 40. In FIG. 6, a long line 41 represents the head of a bar whereas a short line 42 represents a regular beat. The positions of the head 41 of a bar and other beats 42 (three beats at a timing of a quarter note after the head of a bar in the case of four beats) are stored in association with the sample positions of the song.

Figure 7:
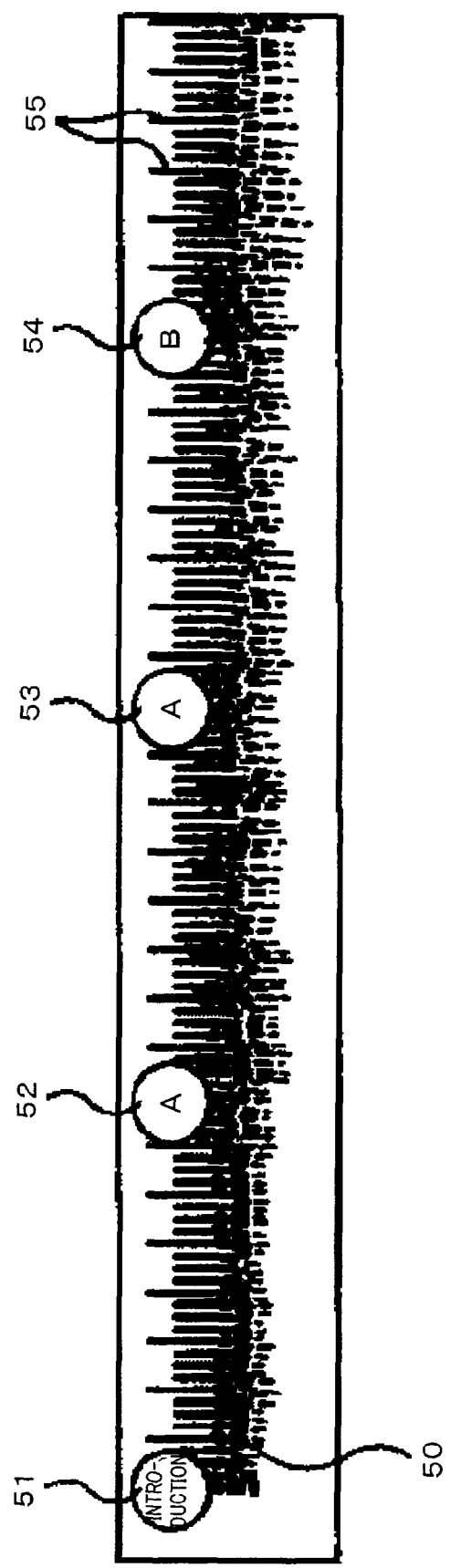
FIG. 7 is a schematic diagram showing another specific example of time-based meta data.

FIG. 7 is a schematic diagram also showing a specific example of time-based meta data. The audio signal 50 can contain not only a beat position 55, but position information that represents a melody composition such as an introduction 51, A melodies 52 and 53, a B melody 54, and a theme (a catchy part) of a song. With this information, the positions of bars and the start position of a particular melody of an objective song can be obtained.

Figure 8A:
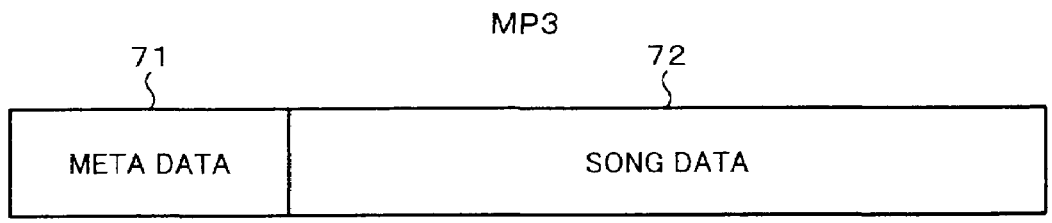
FIG. 8A, FIG. 8B, and FIG. 8C are schematic diagrams showing a method of storing meta data.
Figure 8B:
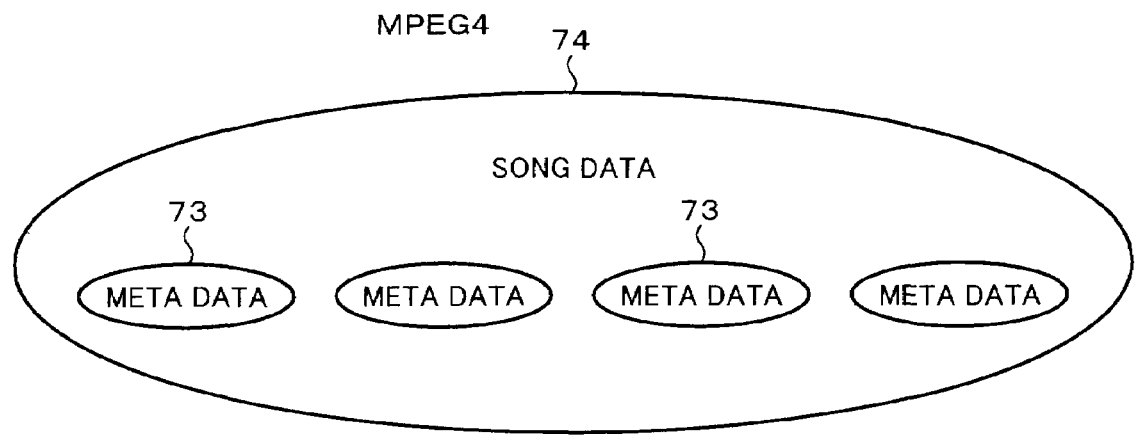
Figure 8C:
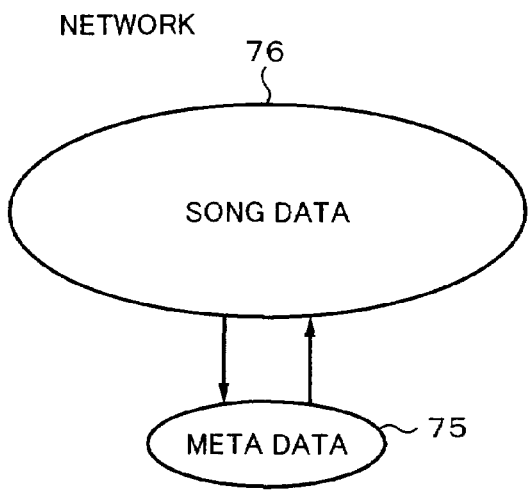

In the music editing apparatus 1 having the structure shown in FIG. 1 and so forth, meta data were stored in the song meta data storage section 6. Instead, meta data may be stored as shown in FIG. 8A, FIG. 8B, and FIG. 8C. FIG. 8A shows an example of which meta data 71 and song data 72 are logically separated and present in the physically same medium as in MP3. FIG. 8B shows an example of which meta data 73 coexist with song data 74 as in MPEG4. FIG. 8C shows an example of which meta data 75 corresponding to song data 76 is retrieved, for example, through a network. In this case, song data and meta data are logically and physically separated from each other. This structure applies to music editing apparatus 80 and 110 (that will be described later) having a network communicating section connected to a network such as the Internet. This structure allows meta data to be downloaded from a site on the network according to the song ID.

FIG. 9 is a schematic diagram showing a specific example of a remix pattern file. Although meta data immediately corresponds to one song, the user can freely create a remix pattern. Thus, the user can create a remix pattern regardless of songs. In other words, a remix pattern file is a file that connects songs in a user's desired manner. In a remix pattern 60, ID_A to ID_E of a song ID (file) 61 may be the same as song names A to E, respectively. Instead, ID_A to ID_E may be absolute file names or file paths. A reproduction portion 62 represents the position of the song to be reproduced. In this example, the position of "a catchy part" is designated for song A, the position of "an introduction" is designed for song B, the position of "8th bar to 20th bar" is designated for song C, the position of all is designated for song D, and the position of "a catchy part" is designated for song E. An (effect) upon reproduction 63 designates what effect is applied to each portion of each song. A connecting method (pattern) 64 denotes that song A is cross-fade, song A and song B are connected with cross-fade, song B and song C are connected with cut-in, song C and song D are connected with cross-fade, and song D and song E are connected by simultaneous reproduction of their catchy parts. On the other hand, an (effect) upon connection 65 designates that when songs are connected, reverb, low-cut, and distortion are applied as effects. A connection SE 66 designates sound effects.

When the pattern shown in FIG. 9 is designated, real reproduction is performed as follows. "The catchy part of ID_A is reproduced.→At the near end of the catchy part of ID_A, the introduction of ID_B is reproduced with cross-fade.→At the end of the introduction of ID_B, the reproduction of the eighth bar of ID_C is started.→ID_D is reproduced with cross-fade several bars after 20 bars of ID_C. At the same time, SE_A is mixed with ID_D.→When the catchy part of ID_D is reproduced, the catchy part of ID_E is also reproduced."

Thus, it can be said that a remix pattern is a conceptual entity of a designation of what parts of songs are connected in what manner is added to a conventional play list.

Figure 10:
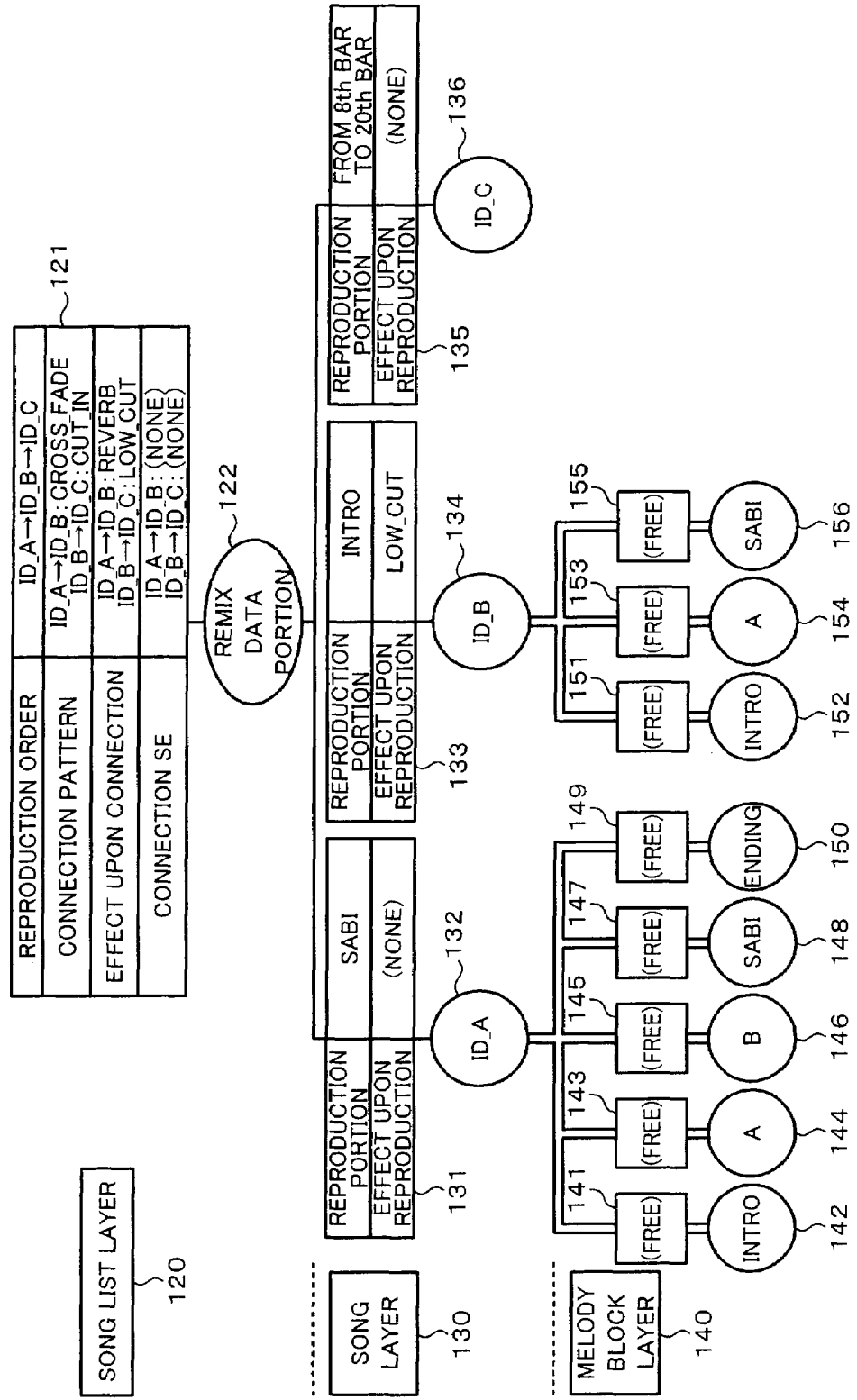
FIG. 10 is a schematic diagram showing a data structure of edit information created by the method of creating edit information according to the present invention.

FIG. 10 is a schematic diagram showing a data structure of edit information created by the method of creating edit information according to the present invention. The data structure corresponds to songs of ID_A, ID_B, and ID_C of the specific example shown in FIG. 9.

In FIG. 10, songs are hierarchized as a song list layer 120, a song layer 130, and a melody block layer 140. Songs are hierarchized in a tree shape and the processes of individual hierarchical layers are different. Each node of the tree is composed of a control parameter portion that creates a song composing method and a song progressing method in real time corresponding to an input from the interface of the music editing apparatus and a data entity portion that is a sound material that composes the song. In addition, nodes are categorized as those that can be processed at the same time on the same hierarchical layer and those that cannot be processed at the same time on the same hierarchical layer.

In FIG. 10, songs and their connection sequences are hierarchized and managed in the following three layers. The song list layer 120 is the most global layer including connection sequences of the song layer. In the song list layer 120, an effect between songs can be changed for simultaneous reproduction by matching, for example, their cross-fade or BPM. A rule base of the song list layer may be created by the creator who created a song rule of the song layer (like the relationship between albums and songs) on the basis of several songs or a third party (the user or another creator) to describe a rule based on which various songs are dynamically used.

The song layer 130 corresponds to one song as an existing concept. The song layer 130 is different from the song list layer 120 in that one song is created by the same creator and complete. From this point of view, the song list layer 120 is a layer on which a plurality of songs are connected and is an upper layer of the song layer 130. Thus, the song layer 130 is composed of a block of data and actions with which an existing song such as "ID_A" is arranged in a particular manner.

The melody block layer 140 is composed of song blocks that compose the song layer 130 that is an upper layer of the melody block layer 140. For example, a regular song has a notional structure, for example, of so-called "an introduction", "A melody", "a catchy part", and "guitar solo". In this system, since songs are disassembled and stored according to such a structure, a song can be edited with macros in such a manner that for example, the introduction of one song is substituted with that of another song or the catchy part of a song is repeated.

The song list layer 120 has a control parameter portion 121. The control parameter portion 121 defines parameters with which a remix data portion 122 that is an object that represents an example of a remix is controlled. As will be described later, the song layer 130 describes song data entities (objects) of ID_A 132, ID_B 134, and ID_C 136. An entity of a remix is described in the remix data portion 122 using these ID_A 132, ID_B 134, and ID_C 136. Control parameters with which the remix data portion 122 is controlled are described in the control parameter portion 121.

The control parameter portion 121 describes a reproduction order, for example, ID_A→ID_B→ID_C. This is partly the same as the order of the example shown in FIG. 9 illustrated above. As connection patterns, ID_A→ID_B designates a cross-fade pattern and ID_B→ID_C designates a cut-in pattern. As effects upon connection, ID_A→ID_B designates reverb and ID_B→ID_C designates low-cut. As connection SE, both ID_A→ID_B and ID_B→ID_C designate none.

The song layer 130 describes control parameter portions 131, 133, and 135. The control parameter portions 131, 133, and 135 are composed of the remix data portion 122 of the song list layer. The control parameter portions 131, 133, and 135 define control parameters that control objects ID_A 132, ID_B 134, and ID_C 136 as entities.

The control parameter portion 131 designates the reproduction portion of a song of ID_A 132 as a theme (catchy part). However, the control parameter portion 131 does not designate the effect upon reproduction. The control parameter portion 133 designates the reproduction portion of a song of ID_B 134 as an introduction. The control parameter portion 133 designates the effect upon reproduction as low-cut. The control parameter portion 135 designates the reproduction portion of a song of ID_C 136 as eighth bar to 20-th bar. The control parameter portion 135 does not designate the effect upon reproduction.

The melody block layer 140 has free control parameter portions 141, 143, 145, 147, 149, 151, 153, and 155. In this example, since processes are statically performed corresponding to a remix pattern, the control parameter portions of the melody block layer 140 do not need parameters. Connected to the individual parameter portions are an introduction portion 142, an A melody portion 144, a B melody portion 146, a catchy part 148, an ending portion 150, an introduction portion 152, an A melody portion 154, and a catchy portion 156 as control entities.

FIG. 11 shows an example of description of a remix pattern file described in XML.-<song_list id="SONG_LIST_1"> defines song list 1. <controller transition="ID_A:ID_B" pattern="CROSS_FADE" effect="REVERB" se=" "/> designates ID_A→ID_B as a cross-fade pattern and an effect as reverb.

In addition, <controller transition="ID_B:ID_C" pattern="CUT_IN" effect="LOW_CUT" se=" "/> designates ID_B→ID_C as a cut-in pattern and an effect as low-cut.

In addition, <song id="ID_A"> defines the reproduction of ID_A. <controller play_segment="MELODY_BLOCK:A" effect=" "/> designates an A melody block and no effect. <melody type="INTRO"/> designates an introduction, <melody type="A"/> designates A melody, <melody type="B"/> designates B melody, <melody type="SABI"/> designates a catchy part, and <melody type="ENDING"/> designates an ending.

In addition, <song id="ID_B"> defines the reproduction of ID_B. <controller play_segment="MELODY_BLOCK:INTRO" effect="LOW_CUT"/> defines that an introduction is reproduced with an effect of low-cut. In addition, <melody type="INTRO"/> designates an introduction, <melody type="A"/> designates A melody, and <melody type="SABI"/> designates a catchy part.

In addition, <song id="ID_C"> designates ID_C. <controller play_segment="BAR:8-20" effect=" "/> designates the reproduction portion of the song as eighth bar to 20-th bar without effect.

Figure 12:
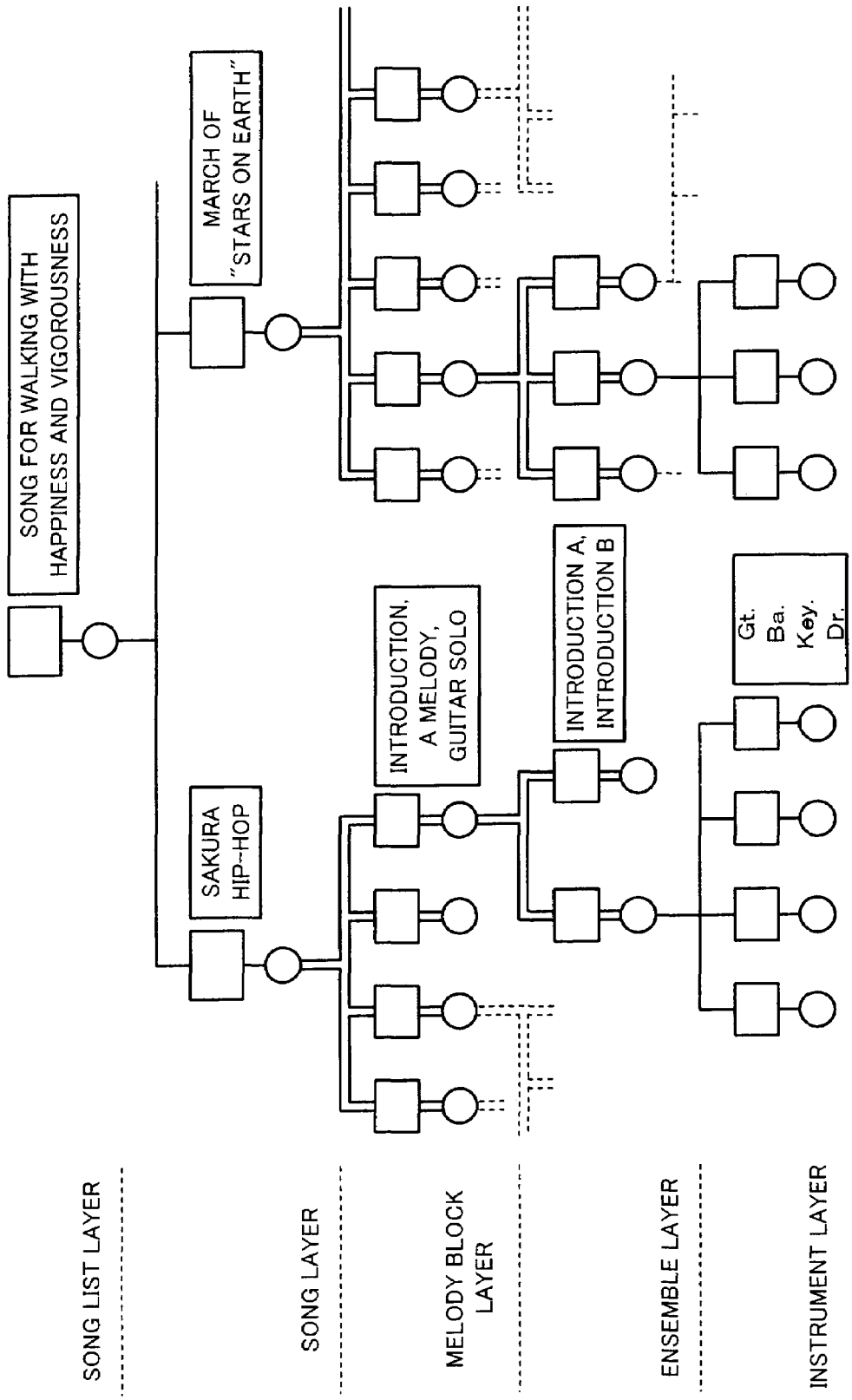
FIG. 12 is a schematic diagram showing a hierarchy of up to an ensemble layer and an instrument layer as well as a song list layer, a song layer, and a melody block layer.

FIG. 12 shows a hierarchy of up to the ensemble layer and the instrument layer as well as the song list layer, the song layer, and the melody block layer. In the ensemble layer, from a view point of song structural units such as an introduction and a catchy part, for example, the first catchy part may be piano and the second catchy part may be horn section instead of piano depending on the number of repetitions. Instead, several bars immediately before another melody block preceded by repetitions may be different from those of the first repetitions.

The instrument layer is a group of audio materials recorded for each of instruments that compose the ensemble layer. The instrument layer may designate a specific file entity. Instead, the instrument layer may be given a retrieval condition such as "bright eight-beat guitar".

Figure 13:
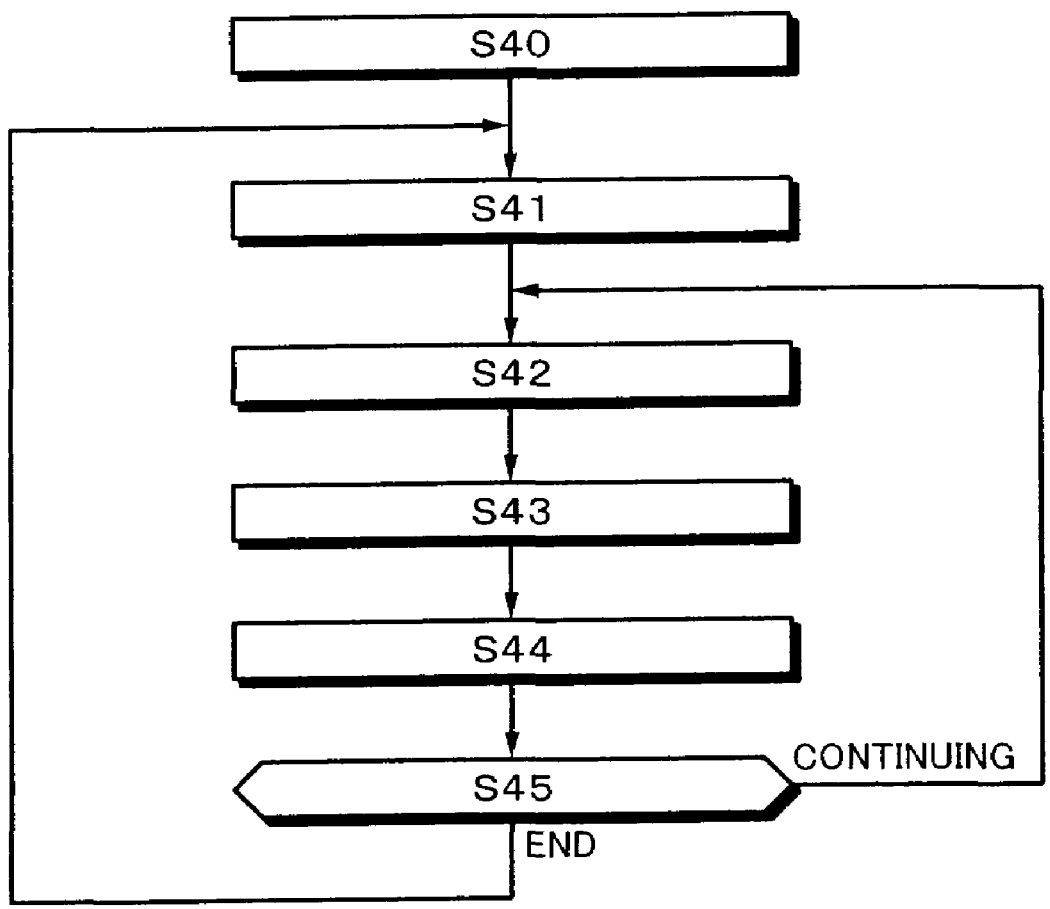
FIG. 13 is a schematic diagram showing an example of control processes of the music editing apparatus based on edit information created by the method of creating edit information according to the present invention, specifically based on a remix pattern file.

FIG. 13 shows an example of control processes of the music editing apparatus 1 based on edit information created by the method of creating edit information according to the present invention, specifically, based on a remix pattern file. In this example, by designating a connecting method of a plurality of songs, they are successively reproduced.

First, a song list is selected by the user (at step S40). Thereafter, a connecting method and songs designated in the control parameter portion of the song layer shown in FIG. 10 and FIG. 12 are selected (at step S41). The designated connecting method includes effect information that designates from what bar cross-fade is performed before the end of the song and what sound is generated in what manner (for example, a sound is reproduced N times corresponding to the beat of the head of a bar).

Thereafter, structural elements of the song are selected in the order of melody blocks, ensembles, and instruments and the song is reproduced (at step S42, step S43, and step S44). These processes are repeated as long as the song end condition is "continuing". When the song end condition has become "end" at step S45, the flow advances to step S41, "select connecting method and songs". As a result, the reproduction of the new songs is started according to the designated connecting method.

Figure 14:
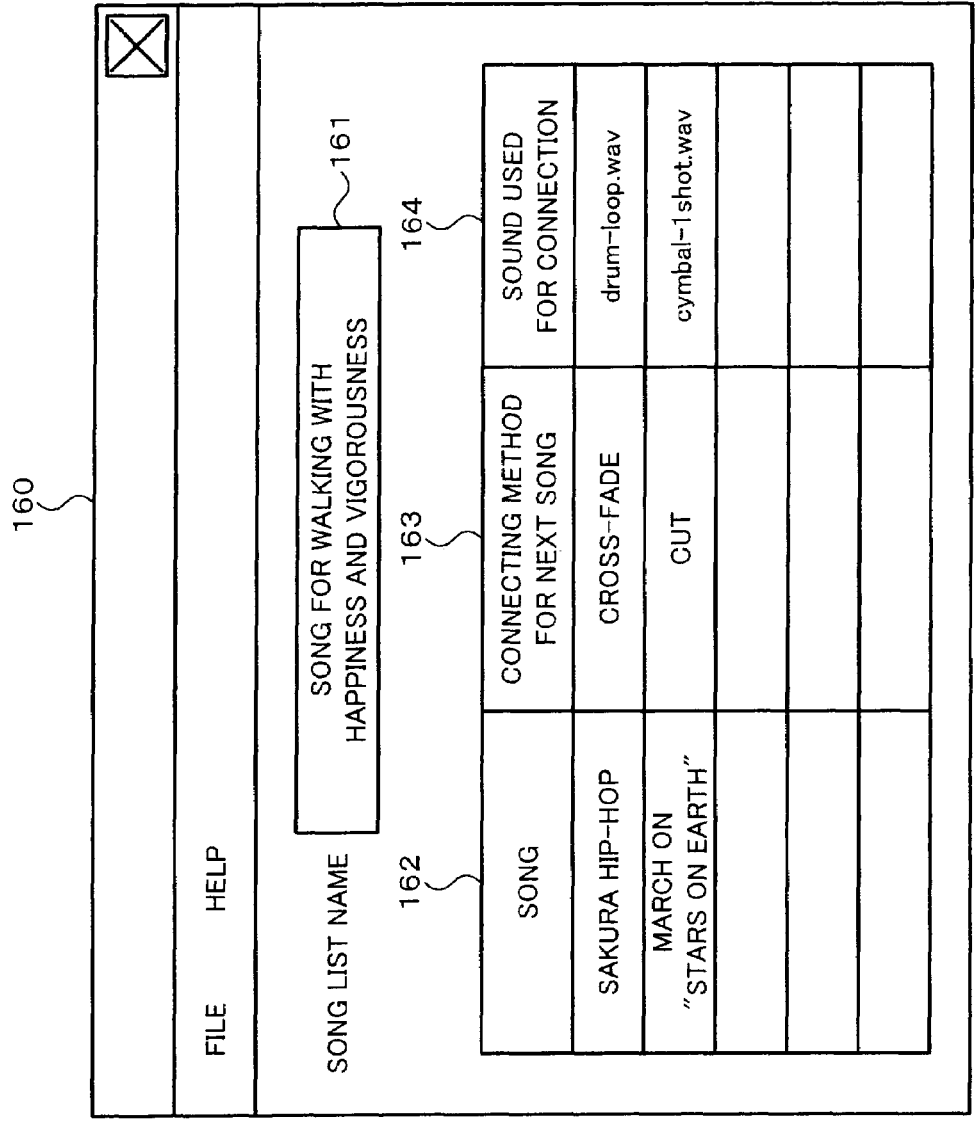
FIG. 14 is a schematic diagram showing an example of a GUI structure of an authoring tool that intuitionally accomplishes a method of creating edit information according to the present invention.

FIG. 14 shows an example of a GUI structure of an authoring tool that intuitionally accomplishes the method of creating the edit information according to the present invention. This is an example of a designating method of connecting songs and reproducing them. On a screen 160, a song list name 161, a song name 162, an effect 163 with which the current song is connected to the next song, and an audio file 164 used to connect songs can be designated.

Thus, with the remix pattern data as edit information having the data structure shown in FIG. 10, since the arrangements of existing songs are changed, a new enjoyment manner can be provided to the user. In addition, the creator can designate changes of arrangements according to inputs from sensors and/or interfaces of the song creating and reproducing apparatus. In addition, since a plurality of songs are connected and reproduced, the user can easily enjoy a reproducing method for songs like DJs.

Figure 28:
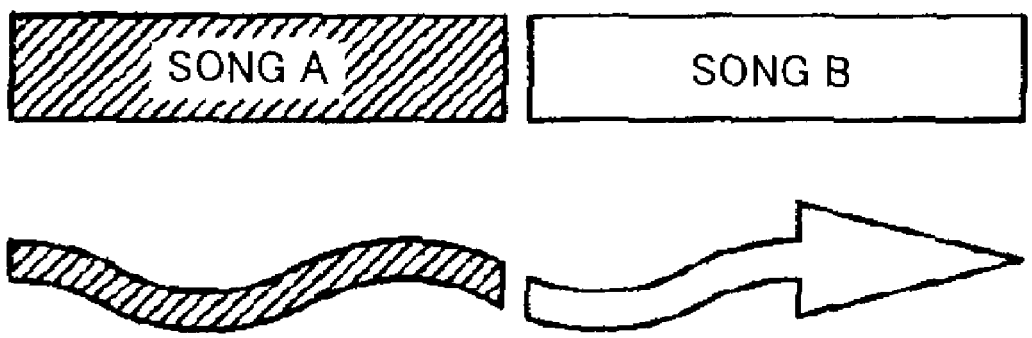
FIG. 28 is a schematic diagram for describing a music reproduction of related art.

Next, with reference to FIG. 15 to FIG. 22, a specific example of a method of connecting songs will be described in brief. In the conventional music reproduction, as shown in FIG. 28, two songs A and B are reproduced with their original tempos and it is most likely that there is a non-sound region between two song A and song B. Although songs can be connected without a non-sound region using the mechanism of a particular reproducing apparatus, many songs have a non-sound region at the beginning and the end. Since these songs partly contain a non-sound region, it is inevitable.

Figure 15:
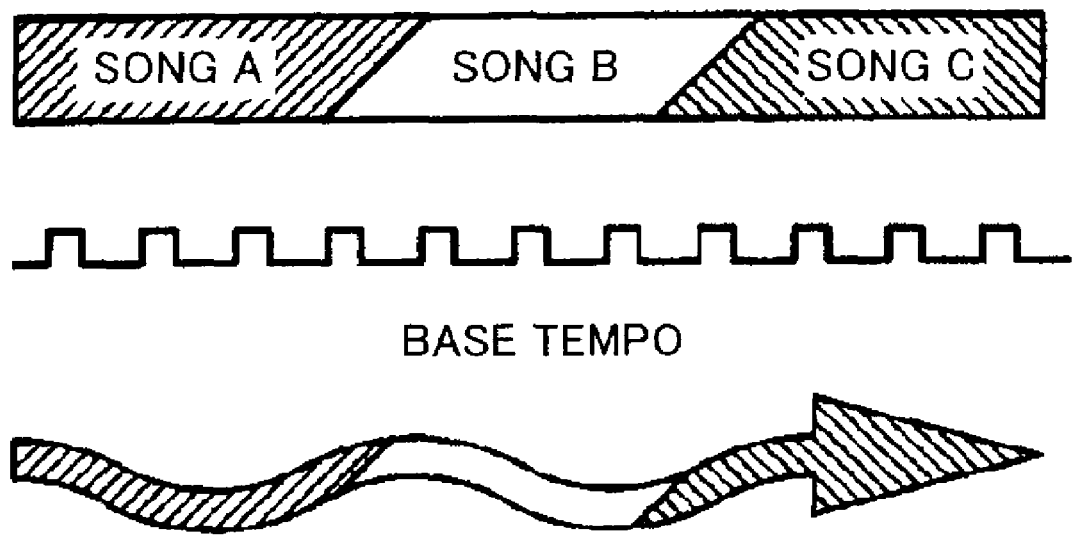
FIG. 15 is a schematic diagram for describing a music reproduction according to the present invention.

In the music editing apparatus 1 having the structure shown in FIG. 1, as shown in FIG. 15, when the tempos of all songs are matched to the common tempo decided by the user or the system and the songs are reproduced with the matched tempo rather than their original tempos in such a manner that the beat positions (down beat positions) of these songs are matched, these songs can be seamlessly connected without causing the user to feel discomfort.

To do that, the music editing apparatus 1 reproduces song A and song B in such a manner that their beats are synchronized. To reproduce songs having different tempos in synchronization with their beats, it is necessary to know their original tempos and their beat positions. In addition, to match the tempos and beat position of the songs to be reproduced, it is necessary to change the reproduction speeds of the songs.

To know the original tempos and beat positions of the songs, the music editing apparatus 1 uses time-based meta data paired with the songs. When the songs are reproduced, their reproduction speeds are changed on the basis of the ratios of their original tempos and the current master beat tempo and the head positions of the bars of the songs are matched.

As described above, the tempos and beat positions of the plurality of songs are accurately handled and their reproduction positions are controlled in real time so that their beats are synchronized. It is assumed that the method of seamlessly connecting songs is based on the method of synchronizing their beats.

Figure 16:
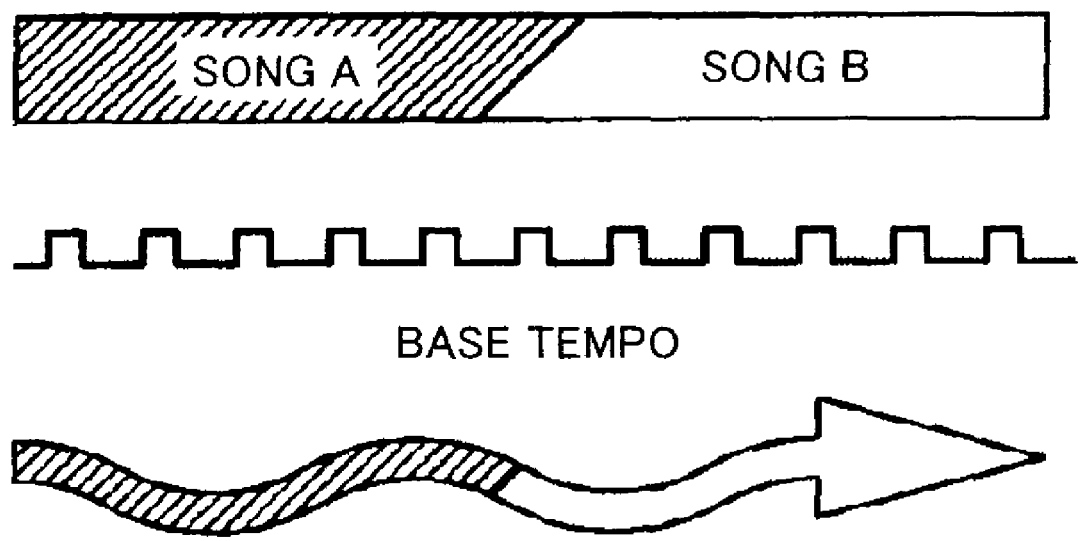
FIG. 16 is a schematic diagram for describing a connection using cross-fade.

FIG. 16 shows an example of which while beats of song A and song B are matched, they are connected by the cross-fade process. While the current song A is being faded out (the sound volume is gradually decreased), the next song B is faded in (the sound volume is gradually increased). When both song A and song B are reproduced at the same time, an effect of which they are seamlessly switched is obtained. Cross-fade is a technique that has been widely used, for example, in FM broadcasts. The point of the present invention is in that since the tempos and beat positions of song A and song B are matched, they are seamlessly connected without causing the user to feel discomfort.

Figure 17:
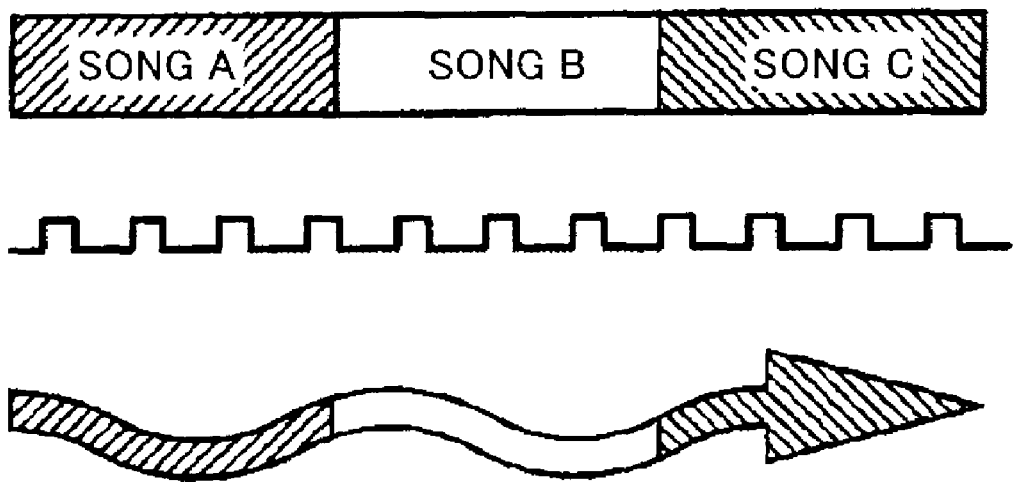

The music editing apparatus 1 can perform a cut-in process outlined in FIG. 17. When musical connections of song A, song B, and song C are clear, it may be preferred that they be directly connected as shown in FIG. 17 rather than they are connected by the cross-fad process. In addition, a song may be intentionally stopped at the end of a beat and the next song may be started at the beginning of the next beat.

The music editing apparatus 1 connects songs with a sound effect (SE) as described above. In other words, a sound effect (SE) can be placed not only between songs, but at a connecting portion of songs and at any portion of a song.

Figure 18:
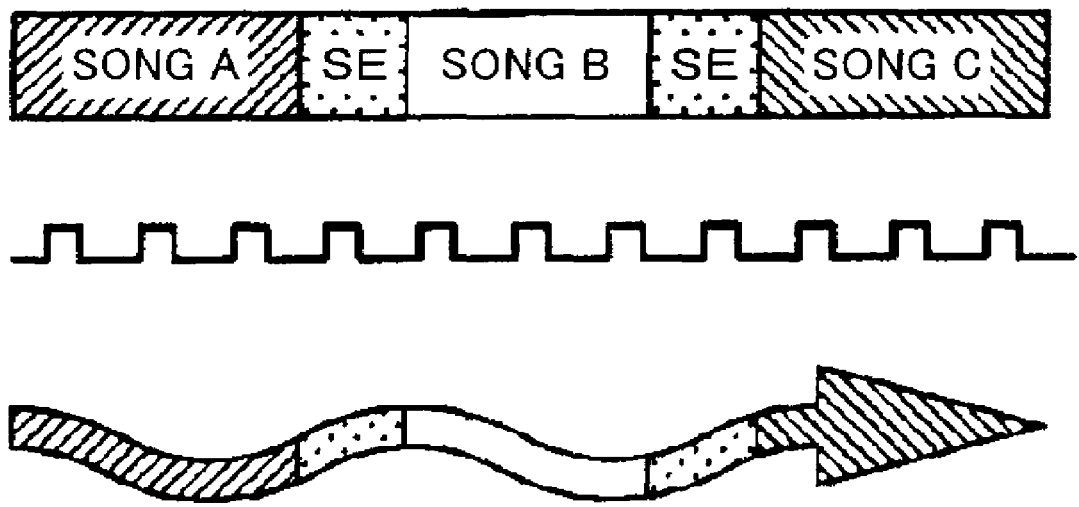
FIG. 18 is a schematic diagram for describing a connection using a sound effect.
Figure 19:
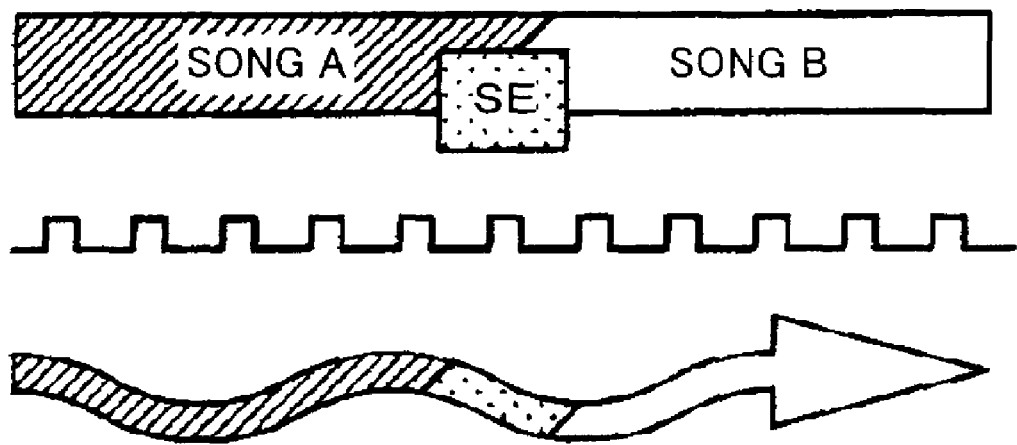
FIG. 19 is a schematic diagram for describing a connection using cross-fade as a sound effect.

FIG. 18 is an example of which sound effects are placed between song A and song B and between song B and song C. FIG. 19 is an example of which a SE is placed between song A and song B and they are connected by the cross-fade process. Of course, in this case, the sound effect can be synchronized with the master beat tempo. When a SE is placed or overlaid between songs, if their melodies largely change, by synchronizing the sound effect with the master beat tempo, these songs can be more naturally connected.

In addition, the music editing apparatus 1 can perform the simultaneous reproduction. In this case, different songs are simultaneously reproduced in such a manner that their beats are synchronized as shown in FIG. 20. Since the tempos and beat positions of songs are synchronized, the user may feel as if they were independent songs.

Figure 21:
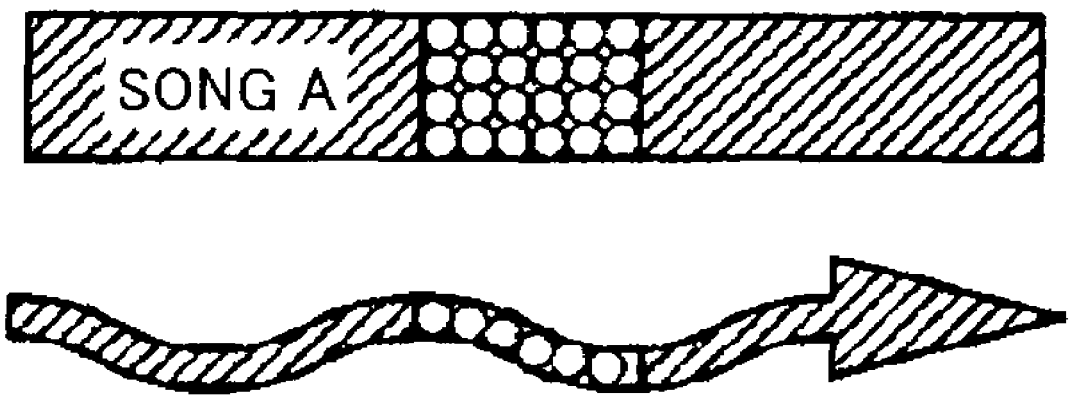
FIG. 21 is a schematic diagram for describing an application of an effect.

In addition, as shown in FIG. 21, the music editing apparatus 1 may place an effect in one song A. In this case, the music editing apparatus 1 applies an effect (sound effect) to a part or all of sound A to change the sound quality. This sound effect includes a process of emphasizing the bass and treble of a song and a process of changing the tone such as reverb, delay, distortion, and maximizer.

While applying reverb as an effect to music A and low-cut filter as an effect to music B, since the music editing apparatus 1 can simultaneously reproduce them or connect them in various manners, the music editing apparatus 1 can accomplish more natural and attractive connecting methods than before.

In addition, the music editing apparatus 1 may apply the foregoing connecting methods not only to an entire song, but to a catchy part or an introduction of each song as shown in FIG. 22. When parts of songs are connected, for example, only catchy parts may be remixed.

As described above, the music editing apparatus 1 can seamlessly remix songs based on a remix pattern file that describes a remix pattern. In this case, the music editing apparatus 1 may decide a master beat tempo that the user has designated or corresponding to the tempo of a main song.

Thus, with the music editing apparatus 1, the user can enjoy music not only in the conventional manner, but in the following new type manner. Unlike the conventional manner, this new type manner cannot be achieved only by passively listening to music. This new type manner allows the user to actively concern himself or herself in music, create a music listening method according to his or her lifestyle, and satisfy his or her exhibitionism.

In other words, the user can stylishly connect his or her favorite parts of songs and listen to them as seamless remix music. In addition, with the music editing apparatus 1, the user can satisfy his or her creative desire for selecting a connecting method of songs on try-and-error basis and stylishly creating a remix.

Figure 23:
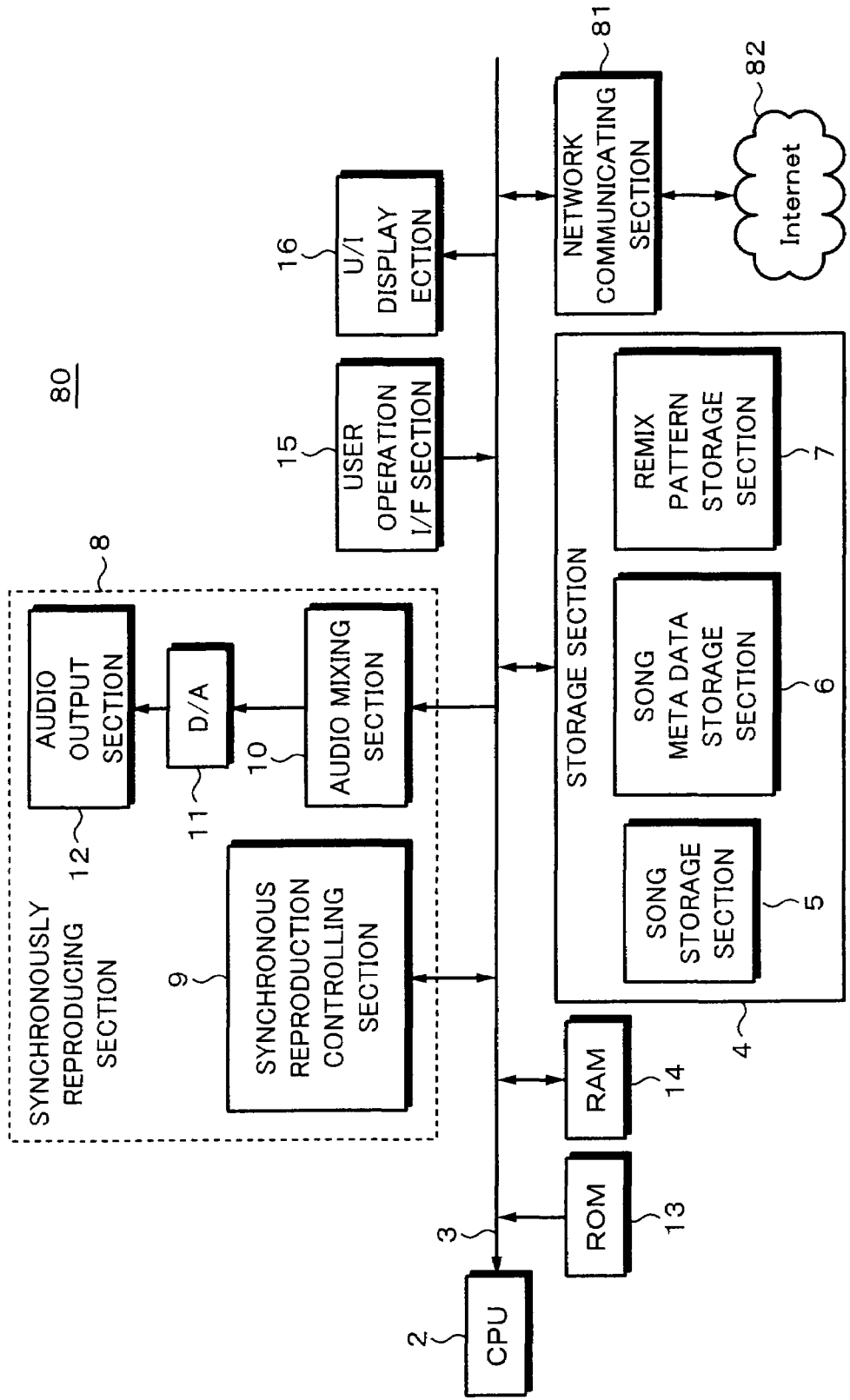
FIG. 23 is a schematic diagram showing a structure of a music editing apparatus having a network communicating section.
Figure 24:
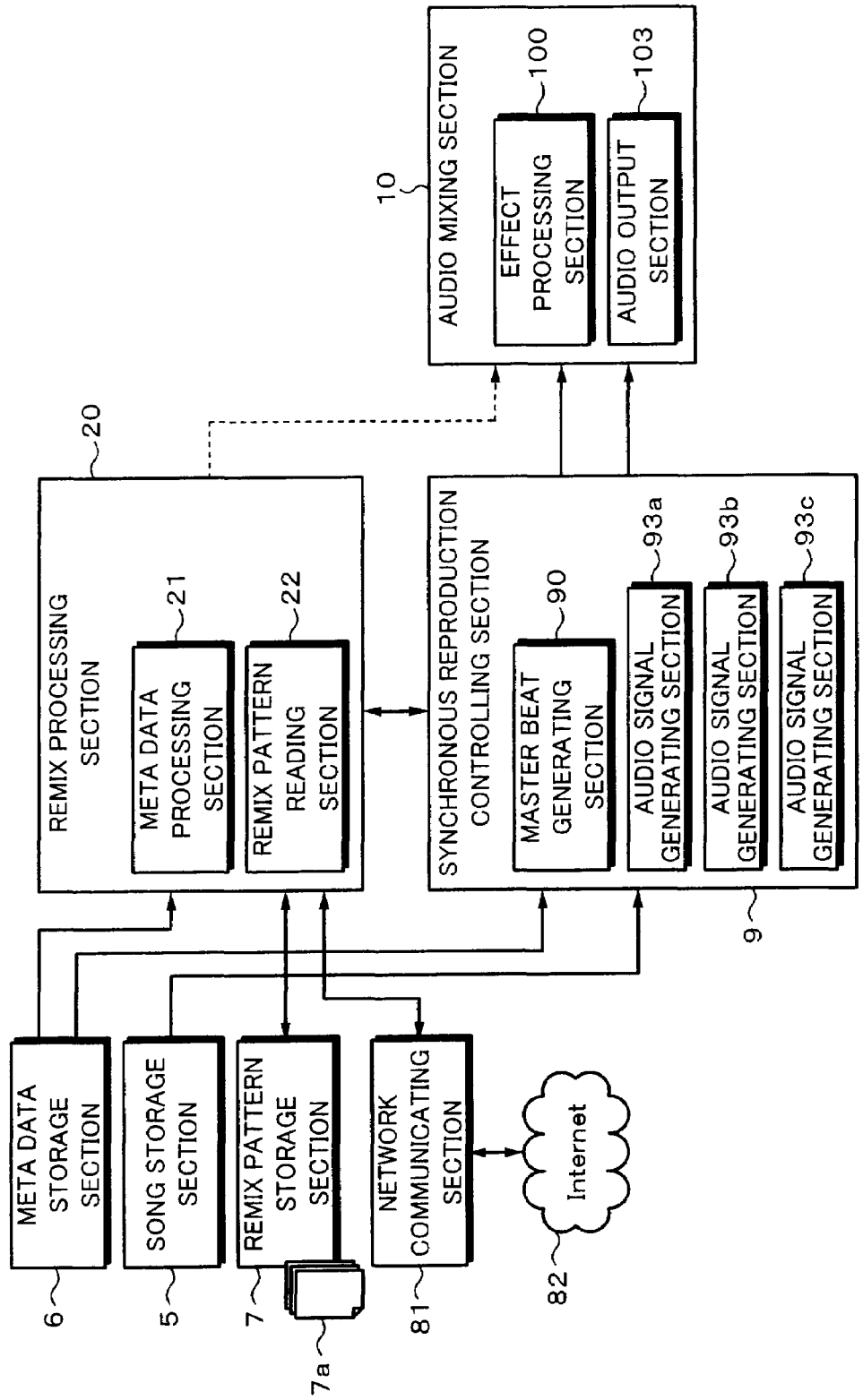
FIG. 24 is a functional block diagram of the music editing apparatus having the network communicating section.

FIG. 23 shows a structure of another music editing apparatus 80 according to an embodiment of the present invention. FIG. 24 is a functional block diagram of the music editing apparatus 80. The music editing apparatus 80 has a network communicating section 81 that can be connected to the Internet 82.

Since the music editing apparatus 80 has the network communicating section 81, the user can exchange and/or share a remix pattern file through a network such as the Internet 82 and a third party can download a remix created by another user and enjoys it. Instead, a remix pattern provided by a content service side rather than a private user may be used.

With the music editing apparatus 80, a new music-based communication through which connecting methods for songs are published on the Internet or the like, they are shared by other persons, and remixes are created and evaluated by a plurality of persons can be accomplished.

Figure 25:
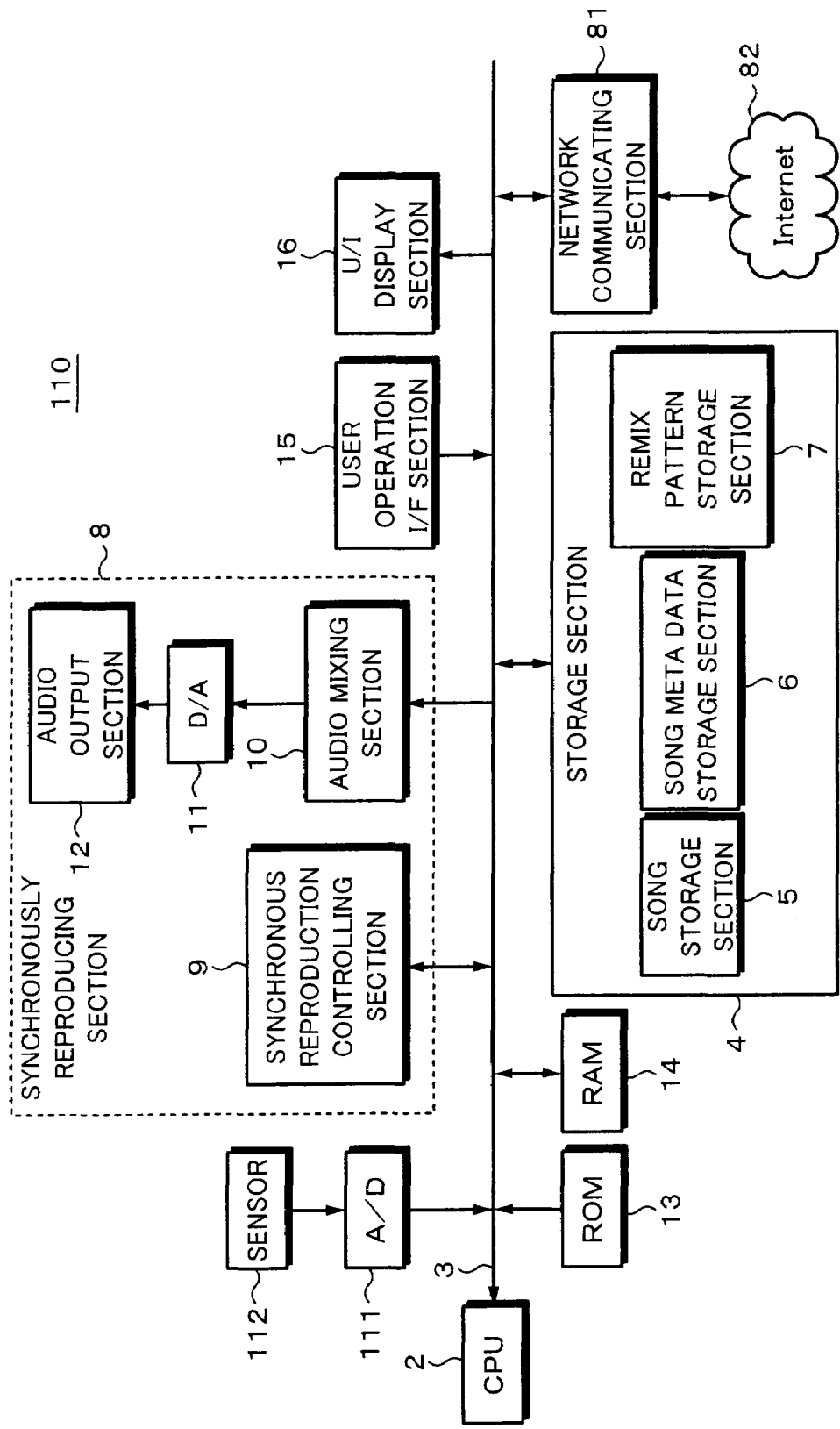
FIG. 25 is a schematic diagram showing a structure of the music editing apparatus having a sensor value obtaining section.
Figure 26:
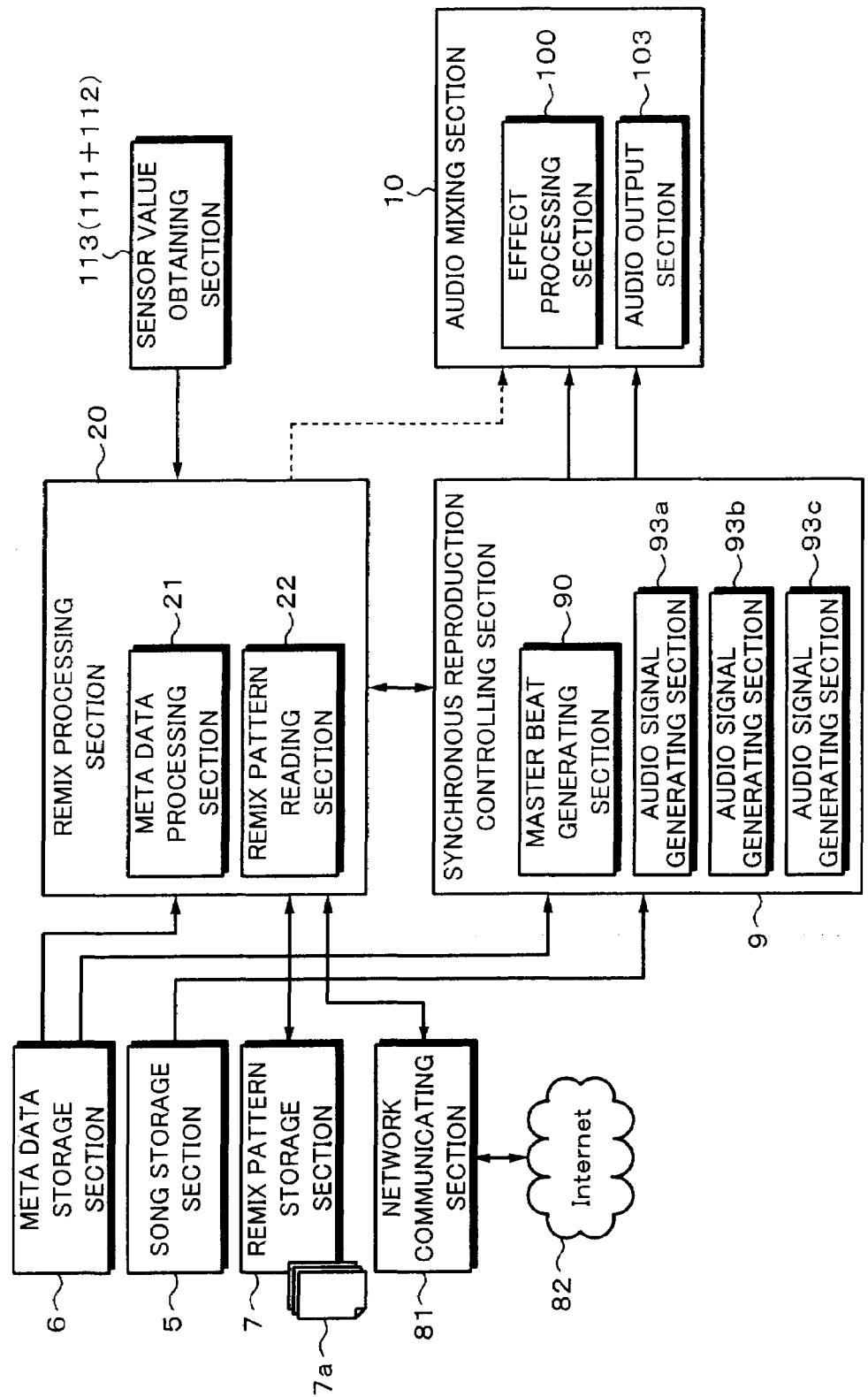
FIG. 26 is a functional block diagram showing the music editing apparatus having the sensor value obtaining section.

FIG. 25 and FIG. 26 show a hardware structure and a functional block diagram of another music editing apparatus 110, respectively. The music editing apparatus 110 has a structure of which a sensor value is obtained from a sensor 112 through an A/D converter 111. The music editing apparatus 110 functionally has a sensor value obtaining section.

As in an invention disclosed, for example, as "reproduction state controlling apparatus and reproduction sate controlling method" (Japanese Patent Application Laid-Open No. 2005-156641), a sensor value obtaining section 113 is based on a technique of detecting a walking tempo using an acceleration sensor and changing the tempo of a song corresponding to the waling tempo. When this example is applied, the tempo of the master beat generating section can be changed corresponding to the walking tempo and all songs can be reproduced as remixes corresponding to the walking tempo and jogging tempo. In addition, as in "reproducing apparatus and reproducing method for audio signal" (Japanese Patent Application No. 2005-363094), an invention of selecting songs corresponding to the walking tempo or jogging tempo may be applied.

To apply these techniques, a sensor is essential. When the sensor and the algorithms of these inventions are applied to the system of the present invention, songs can be selected corresponding to the state of the user, the selected songs can be connected as remixes, and they can be seamlessly reproduced.

Figure 27A:
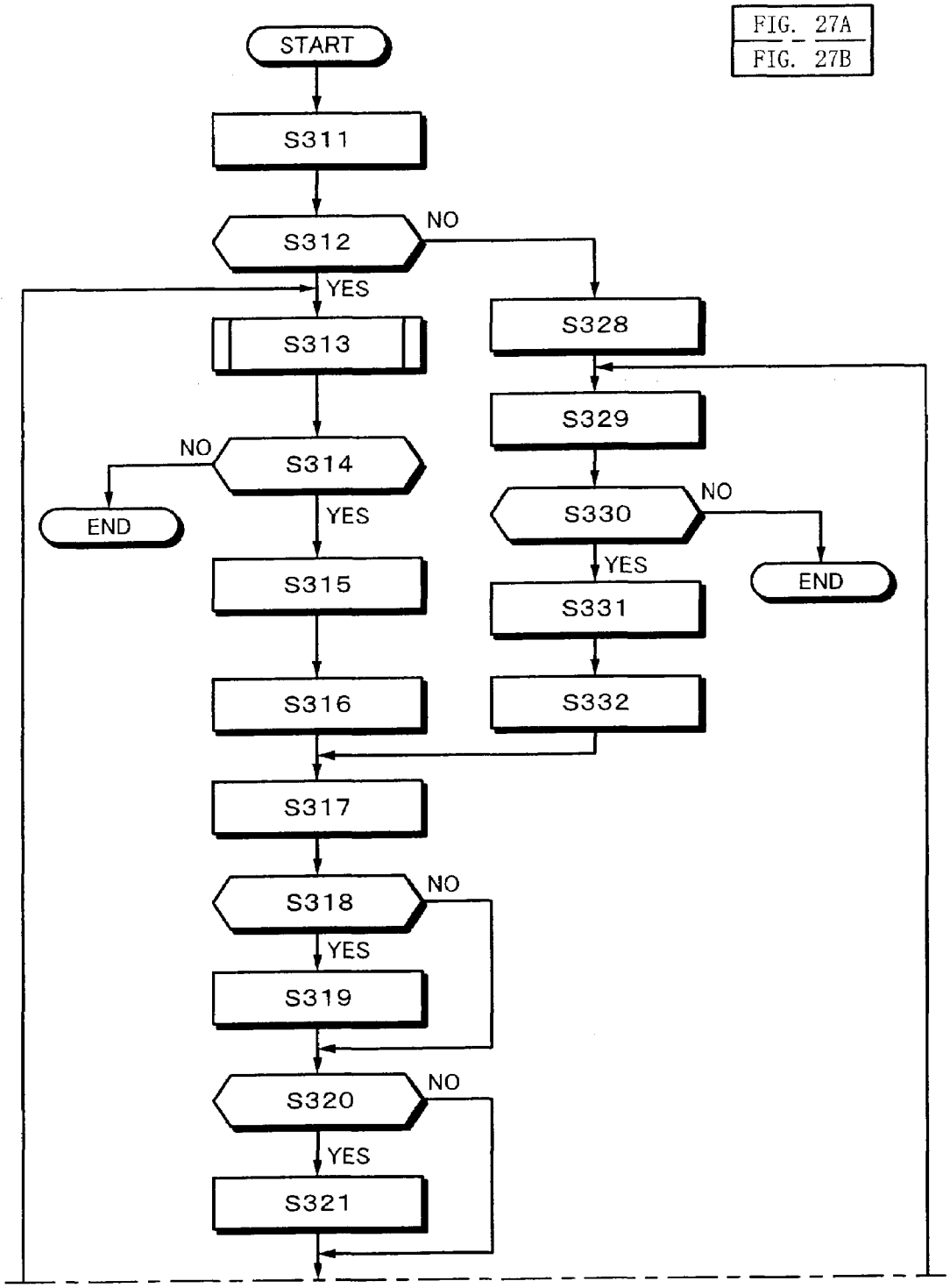
FIG. 27A and FIG. 27B are flow charts showing processes of the music editing apparatus having the sensor value obtaining section.
Figure 27B:
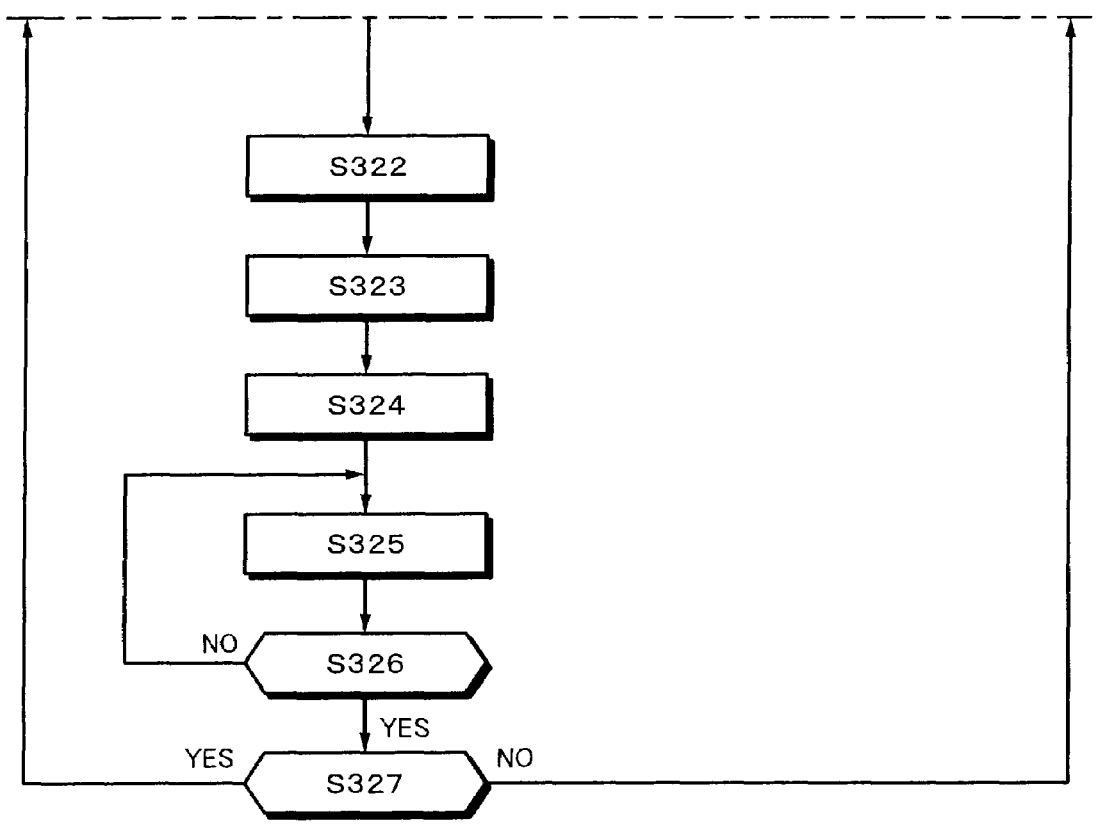

FIG. 27A and FIG. 27B are flow charts showing processes of the music editing apparatus 110 having a sensor priority mode. The processes have a sensor priority mode in addition to a remix pattern priority mode. Processes change, for example, depending on the mode that the user selects. In the sensor priority mode, the sensor detects, for example, a walking pattern or a jogging pattern and the music editing apparatus 110 changes the beat corresponding to the detected pattern.

First, it is determined whether the mode of the music editing apparatus 110 is the sensor priority mode or the pattern priority mode (at step S311). In this case, the sensor priority mode is based on the technique of selecting a song depending on whether the user is walking or jogging. The sensor decides the order of songs and selects songs. Thus, songs may not be decided corresponding to a pattern. It may suggest that they are dynamically changed. In other words, as a concept, the music editing apparatus 110 dynamically creates a pattern file with a value supplied from the sensor, not read a prefixed pattern file.

When the pattern priority mode rather than the sensor priority mode has been selected at step S311, the same processes shown in FIG. 4 are performed.

Next, the case of which the sensor priority mode has been selected at step S311 or step S12 will be described. In this case, songs are automatically selected corresponding to jogging and the selected songs are automatically connected corresponding thereto.

As a subroutine, songs and their tempos are decided corresponding to the input from the sensor (at step S313). When the determined result at step S314 denotes that there is another song, the flow advances to step S315. At step S315, a master beat tempo is set. In this case, the master beat tempo has been detected and set corresponding to the walking tempo. In this case, since songs are not always connected by a predetermined connecting method, the tempo is automatically decided (at step S316). For example, in the jogging mode, all the songs may be simply connected by the crossfade process. Instead, since meta data of the next song denotes that it is fad in, the song may be simply overlaid. Since the processes after step S317 are the same as those from step S6 to step S15 of FIG. 4, their description will be omitted.

Thus, with the music editing apparatus 110, songs are selected corresponding to the jogging tempo and the selected songs are seamlessly connected. Thus, since the songs do not disorder the tension and tempo of jogging, the user can comfortably enjoy jogging. With a particular type of a sensor, a remix corresponding to another rhythmical motion (for example, dance) or the heart rate of the user instead of jogging can be created.

Songs are selected corresponding to the input from the sensor, the tempos of the selected songs are matched to the tempo of the jogging, and the songs are remixed with the adjusted tempo. Thus, the user can enjoy his or her favorite songs corresponding to his or her tempo.

In addition, timer remix reproduction can be performed. It is assumed that the user wants to listen to songs of a play list of an album in 30 minutes for his or her commuting. Conventionally, if the duration of the album is 60 minutes, he or she has to stop reproducing songs in 30 minutes. In contrast, according to the present invention, a remix can be created by selecting tempos and portions of songs so that the reproduction duration of songs becomes 30 minutes. The timer remix reproduction can be applied to jogging. When the user wants to jog only for 30 minutes, a remix of songs for 30 minutes corresponding to the tempo of jogging can be created.

A remix of only catchy parts of songs for 30 minutes of commuting can be created so that the remix is complete when the user arrives at the destination. In addition, as the current time approaches the arrival time, an atmosphere that allows the user to feel that he or she is approaching the destination can be created in such a manner that the tempo of songs is gradually decreased or a particular SE is overlaid.

As described above, with the music editing apparatus 80 and 110, a new music-based communication through which a connecting method for songs is published, for example, on the Internet, shared by other persons, remixes are created by a plurality of persons, and they are evaluated by them can be achieved. In addition, with a sensor, the user can listen to music that well fit his or her situation and state.

These features will make a new wave against the conventional world in which the user enjoys work that professional creators and musicians created and allow the user to experience a new world in which he or she reuses and recomposes their work as materials with which he or she expresses himself or herself and enjoy the result.

When users who find an amusement in such a new type music increase, the entire music industry will become active. In addition, from a view point of the music industry side, there is a possibility of which there will be music work that allows the user side to recompose and new creators to create such work. Thus, there is a possibility of which the industry and users can establish new music cultures.

Last, the features that can be used in the music editing apparatus according to the present invention will be described. This music editing apparatus is a song creating and reproducing apparatus having a reproducing section that matches tempos and downbeats of a plurality of songs stored in the storage section with a predetermined timing, stores the resultant songs in a plurality of reproduction controlling sections, and synchronously reproduces the plurality of songs at the same time. In addition, the songs are characterized in that all or a part of each of the songs is used. In addition, the songs are characterized in that they are not limited to musically composed songs, but include sounds such as sound effects, conversation, and announcement.

In addition, the music editing apparatus is characterized in that when the synchronizing reproduction is performed, a sound generation can be started/stopped at any song start position and at any timing of any song. In addition, the music start position and timing can be designated particularly in the unit of one bar, one beat, and one melody composition unit.

In addition, with the foregoing features, while a particular song is being reproduced, any part of another song can be simultaneously reproduced at any timing. Likewise, with the foregoing features, the reproduction of any part of a song that is being reproduced can stopped and any part of another song can be seamlessly reproduced.

In addition, the music editing apparatus is characterized in that while it is performing the foregoing synchronizing reproduction, it can discretely adjust the sound volume of each of songs that it simultaneously reproduces. With the sound volume adjustment, while the apparatus is performing the simultaneous reproduction, it can decrease the sound volume of a song that it is currently reproducing, increase the sound volume of the next song, combine the resultant songs, and reproduce them.

In addition, the apparatus is characterized in that while it is performing the synchronizing reproduction, it can apply an effect process as a signal process to each of songs for the synchronizing reproduction. In addition, the apparatus is characterized in that while it is performing the synchronizing reproduction, it controls timings based on meta data composed of tempo, bar, down-beat position, melody composition change position information, and so forth that have been recorded to each song.

The music editing apparatus is characterized in that meta data and a song are recorded in the same file or different files and the relationship therebetween is managed with a database and an identifier and that the range of songs, sound generation start timing, sound volume control method, and type of effect process for the synchronizing reproduction are controlled in real time based on a pattern file that describes a song creating and reproducing method.

In addition, the music editing apparatus is characterized in that the tempo is designated by the user or is automatically decided by the apparatus and that as a tempo that is automatically decided by the apparatus, input data from a sensor are used.

The sensor is characterized in that it can be added to the apparatus and includes any types such as an acceleration sensor, a gyro sensor, a heart rate sensor, a body temperature sensor, a body motion sensor, and a cerebral wave sensor. The pattern file is characterized in that it is not only recorded in the storage section of the apparatus, but it may be obtained from an external storage device or through the Internet.

The file that describes a remix method for songs is characterized in that when the music editing apparatus successively reproduces songs, the file describes song connection information that allows an effect such as cross-fade to be applied or another sound to be mixed so as to seamlessly reproduce the songs rather than discretely reproduce the songs.

In addition, the music editing apparatus is characterized in that the user can designate the reproduction position of a song and the connecting method for songs corresponding to a user's operation to the interface of the song creating and reproducing apparatus and an input from a sensor disposed outside of the song creating and reproducing apparatus. In addition, the music editing apparatus is characterized in that song arrangement methods such as mixing another sound and a song at other than connection portion of songs, applying an effect, and designating a changing method for these control parameters can be performed.

DESCRIPTION OF REFERENCE NUMERALS

1 MUSIC EDITING APPARATUS
2 CPU
4 STORAGE SECTION

5 SONG STORAGE SECTION
6 SONG META DATA STORAGE SECTION
7 REMIX PATTERN STORAGE SECTION
8 SYNCHRONOUSLY REPRODUCING SECTION
9 SYNCHRONOUS REPRODUCTION CONTROLLING SECTION
10 AUDIO MIXING SECTION
20 REMIX PROCESSING SECTION
21 META DATA PROCESSING SECTION
22 REMIX PATTERN READING SECTION
90 MASTER BEAT GENERATING SECTION
93a, 93b, 93c AUDIO SIGNAL GENERATING SECTION
S1 OBTAIN REMIX PATTERN FILE.
S2 OBTAIN NEXT SONG.
S3 IS THERE NEXT SONG?
S4 DECIDE MASTER BEAT TEMPO.
S5 OBTAIN CONNECTION PATTERN.
S6 OBTAIN META DATA OF SONG.
S7 IS EFFECT PROCESS NECESSARY?
S8 VALIDATE EFFECT PROCESSING SECTION.
S9 IS SOUND VOLUME FADE PROCESS NECESSARY?
S10 SET FADE PARAMETER.
S11 SET ORIGINAL TEMPO OF SONG TO SYNCHRONIZING REPRODUCTION CONTROLLING SECTION.
S12 OBTAIN FREE AUDIO SIGNAL GENERATING SECTION.
S13 SET SONG TO SYNCHRONIZING REPRODUCTION CONTROLLING SECTION.
S14 OBTAIN CURRENT REPRODUCTION POSITION OF EACH SONG.
S15 HAS POINT AT WHICH NEXT SONG IS PREPARED OCCURRED?
S11 DECIDE SENSOR PRIORITY MODE OR PATTERN PRIORITY MODE.
S12 SENSOR PRIORITY MODE?
S13 DECIDE SONG AND TEMPO ACCORDING TO INPUT FROM SENSOR.
S14 IS THERE NEXT SONG?
S15 SET MASTER BET TEMPO.
S16 AUTOMATICALLY DECIDE CONNECTION PATTERN.
S17 OBTAIN META DATA OF SONG.
S18 IS EFFECT PROCESS NECESSARY?
S19 VALIDATE EFFECT PROCESSING SECTION.
S20 IS SOUND VOLUME FADE PROCESS NECESSARY?
S21 SET FADE PARAMETER.
S22 SET ORIGINAL TEMPO OF SONG TO SYNCHRONIZING REPRODUCTION CONTROLLING SECTION.
S23 OBTAIN FREE AUDIO SIGNAL GENERATING SECTION.
S24 SET SONG TO SIMULTANEOUS REPRODUCTION CONTROLLING SECTION.
S25 OBTAIN CURRENT REPRODUCTION POSITION OF EACH SONG.
S26 HAS POINT AT WHICH NEXT SONG IS PREPARED OCCURRED?
S27 SENSOR PRIORITY MODE?
S28 OBTAIN REMIX PATTERN FILE.
S29 OBTAIN NEXT SONG.
S30 IS THERE NEXT SONG?
S31 DECIDE MASTER BEAT TEMPO.
S32 OBTAIN CONNECTION PATTERN.
S40 SELECT SONG LIST.
S41 SELECT CONNECTING METHOD AND SONG.
S42 SELECT MELODY BLOCK.
S43 SELECT ENSEMBLE.
S44 SELECT INSTRUMENT.
S45 DETERMINE SONG END CONDITION.

The invention claimed is:

1. A music editing apparatus, comprising,
a remix processing section which performs a remix process based on both meta data that are pre-generated corresponding to song data and that contain at least a time-based beat position and a file for deciding a remix pattern;
a synchronizing reproduction controlling section which generates a master beat, sends the master beat to the remix processing section, and reproduces a plurality of songs based on individual entries of the meta data according to the remix process that the remix processing section has designated corresponding to the remix pattern and the meta data; and
a mixing section which mixes songs reproduced by the synchronizing reproduction controlling section,
the remix processing section being characterized in that the remix processing section performs the remix process based on a remix pattern file structured as hierarchical layers each of which has a control parameter portion and a data entity portion.

2. The music editing apparatus as set forth in claim 1, characterized in that the remix processing section has a meta data processing section which processes the meta data and a remix pattern reading section which reads the remix pattern.

3. The music editing apparatus as set forth in claim 1, characterized in that the synchronizing reproduction processing section has a master beat generating section which generates a master beat and supplies the generated master beat to the remix processing section; and a plurality of audio signal generating sections which generate audio signals of a plurality of songs.

4. The music editing apparatus as set forth in claim 1, further comprising:
a meta data storage section which stores the meta data; a song storage section which stores the song data; and a remix pattern storage section which stores the remix pattern.

5. A method of creating edit information referred to as a remix pattern by a music editing apparatus having a remix processing section which performs a remix process based on both meta data that are pre-generated corresponding to song data and that contain at least a time-based beat position and a file for deciding a remix pattern; a synchronizing reproduction controlling section which generates a master beat, sends the master beat to the remix processing section, and reproduces a plurality of songs based on individual entries of the meta data according to the remix process that the remix processing section has designated corresponding to the remix pattern and the meta data; and a mixing section which mixes songs reproduced by the synchronizing reproduction controlling section,
characterized in that a remix pattern file structured as hierarchical layers each of which has a control parameter portion and a data entity portion is created by causing the control parameter portion of a lower hierarchical layer which composes a data portion of an upper hierarchical layer to process the data entity portion of the same hierarchical layer.

6. The method of creating edit information as set forth in claim 5, characterized in that the hierarchical layers are a song list layer, a song layer, and a melody block layer viewed from a top layer side.

7. The method of creating edit information as set forth in claim 6, characterized in that the control parameter portion of the song list layer is used to control the remix entity data section, the remix entity data section is composed of a plurality of control parameter portions of the song layer, the plurality of control parameters of the song layer are used to control each of the entity data sections of the song layer, and a plurality of entity data sections are statically executed in the memory block layer.

8. A record medium on which edit information referred to as a remix pattern by a music editing apparatus has been recorded, the music editing apparatus having a remix processing section which performs a remix process based on both meta data that are pre-generated corresponding to song data and that contain at least a time-based beat position and a file for deciding a remix pattern; a synchronizing reproduction controlling section which generates a master beat, sends the master beat to the remix processing section, and reproduces a plurality of songs based on individual entries of the meta data according to the remix process that the remix processing section has designated corresponding to the remix pattern and the meta data; and a mixing section which mixes songs reproduced by the synchronizing reproduction controlling section, characterized in that recorded in a remix pattern file structured as hierarchical layers each of which has a control parameter portion and a data entity portion is edit information created by causing the control parameter portion of a lower hierarchical layer which composes a data portion of an upper hierarchical layer to process the data entity portion of the same hierarchical layer.

* * * * *